(12) United States Patent
Sakuraba et al.

(10) Patent No.: US 11,519,466 B2
(45) Date of Patent: Dec. 6, 2022

(54) ELECTROMAGNETIC CLUTCH

(71) Applicant: DENSO CORPORATION, Kariya (JP)

(72) Inventors: Shigeyoshi Sakuraba, Kariya (JP);
Toshihiro Hayashi, Kariya (JP);
Kiyoshi Kurohata, Kariya (JP);
Toshihiro Konishi, Kariya (JP);
Kazuma Tachibana, Kariya (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 17/071,051

(22) Filed: Oct. 15, 2020

(65) Prior Publication Data

US 2021/0025462 A1 Jan. 28, 2021

Related U.S. Application Data

(63) Continuation of application No. PCT/JP2019/014981, filed on Apr. 4, 2019.

(30) Foreign Application Priority Data

May 11, 2018 (JP) .............................. JP2018-092158

(51) Int. Cl.
*F16D 27/112* (2006.01)
*F16D 27/14* (2006.01)
(Continued)

(52) U.S. Cl.
CPC ............ *F16D 27/112* (2013.01); *F16D 27/14* (2013.01); *F16D 2121/20* (2013.01);
(Continued)

(58) Field of Classification Search
CPC .. F16D 27/112; F16D 2027/007; F16D 27/14; F16D 3/06; F16D 3/12; F16D 3/52;
(Continued)

(56) References Cited

U.S. PATENT DOCUMENTS

| 6,286,650 B1 | 9/2001 | Tabuchi et al. |
| 2003/0159901 A1 | 8/2003 | Hayashi |

(Continued)

FOREIGN PATENT DOCUMENTS

| JP | S62-054335 U | 4/1987 |
| JP | S62-167936 U | 10/1987 |

(Continued)

*Primary Examiner* — Richard M Lorence
(74) *Attorney, Agent, or Firm* — Oliff PLC

(57) ABSTRACT

An armature is configured to come into contact with an actuator due to magnetic attraction force. An outer plate is fixed to an armature, the outer plate being located on an opposite side of the armature from the actuator, the outer plate being configured to rotate together with the armature. An inner hub is located between the armature and the outer plate to be movable in a direction along a rotation axis, the inner hub being fixed to a driven device. A rubber member is disposed between the inner hub and the outer plate to give an urging force to the inner hub and the outer plate in a direction away from each other. This electromagnetic clutch is configured such that the urging force of the rubber member non-linearly increases as the actuator and the armature approach each other due to the magnetic attraction force.

9 Claims, 20 Drawing Sheets

(51) Int. Cl.
*F16D 121/20* (2012.01)
*F16D 127/02* (2012.01)

(52) U.S. Cl.
CPC .. *F16D 2127/02* (2013.01); *F16D 2200/0056* (2013.01); *F16D 2300/08* (2013.01); *F16D 2300/14* (2013.01); *F16D 2300/22* (2013.01)

(58) Field of Classification Search
CPC ... F16D 3/68; F16D 3/76; F16D 13/76; F16D 2121/20; F16D 2127/02; F16D 2200/0056; F16D 2300/08; F16D 2300/14; F16D 2300/22; F16F 15/126
USPC ........................................ 192/84.941, 84.961
See application file for complete search history.

(56) References Cited

U.S. PATENT DOCUMENTS

2005/0139446 A1* 6/2005 Imai ..................... F16D 27/112
                                                           192/209
2011/0127136 A1    6/2011 Sakuraba et al.

FOREIGN PATENT DOCUMENTS

| JP | H09-210095 A | 8/1997 |
| JP | 2000-120791 A | 4/2000 |

\* cited by examiner

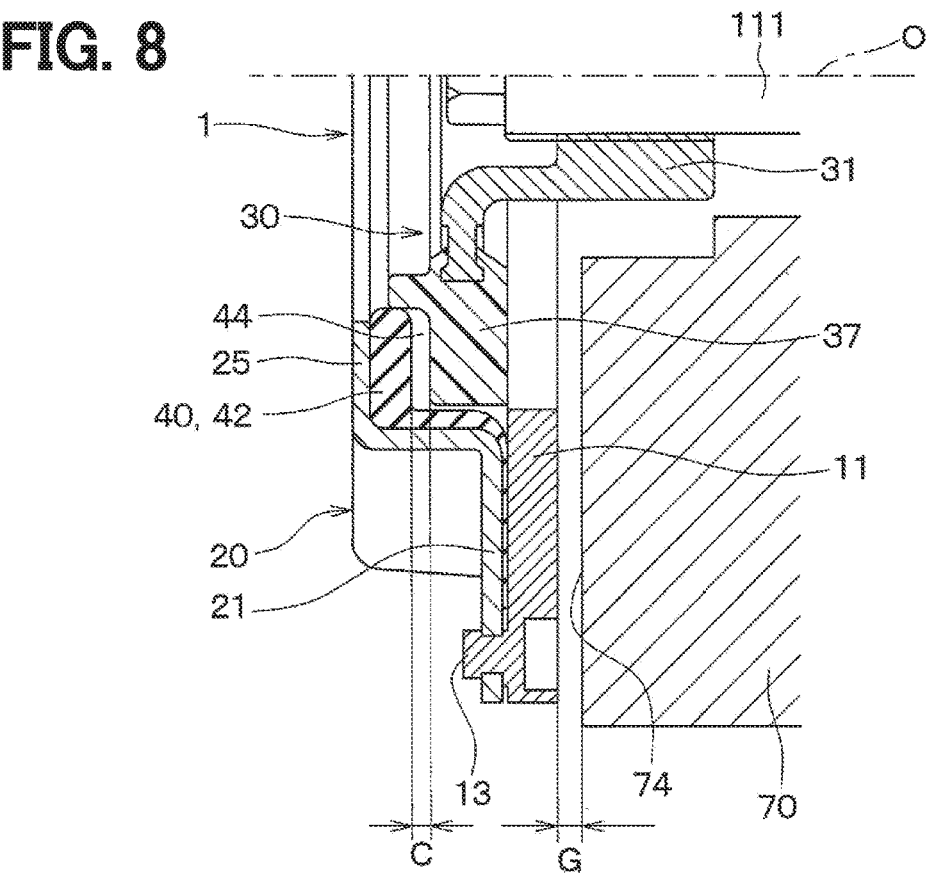
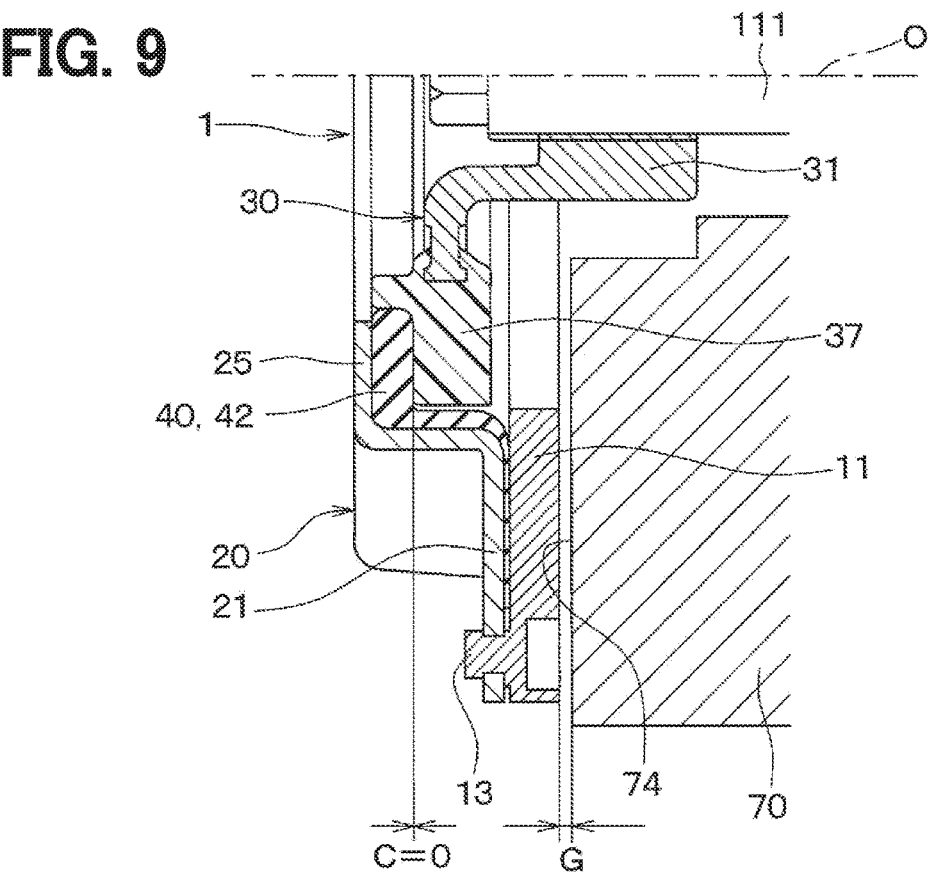

ELECTROMAGNETIC CLUTCH

CROSS REFERENCE TO RELATED APPLICATION

The present application is a continuation application of International Patent Application No. PCT/JP2019/014981 filed on Apr. 4, 2019, which designated the U.S. and claims the benefit of priority from Japanese Patent Application No. 2018-092158 filed on May 11, 2018. The entire disclosures of all of the above applications are incorporated herein by reference.

TECHNICAL FIELD

The present disclosure relates to an electromagnetic clutch for transmitting torque from an actuator to a driven device.

BACKGROUND

In recent years, there has been an increasing demand for noise reduction of vehicles, and it has been required to reduce the noise of an electromagnetic clutch.

SUMMARY

According to an aspect of the present disclosure, an electromagnetic clutch configured to transmit torque from an actuator to a driven device includes: an armature configured to come into contact with the actuator due to magnetic attraction force; an outer plate fixed to the armature, the outer plate being located on an opposite side of the armature from the actuator, the outer plate being configured to rotate together with the armature; an inner hub located between the armature and the outer plate to be movable in a direction along a rotation axis, the inner hub being engaged with the armature or the outer plate with respect to a direction of rotation, the inner hub being fixed to the driven device; and a rubber member disposed between the inner hub and the outer plate to give an urging force to the inner hub and the outer plate in a direction away from each other. The urging force of the rubber member non-linearly increases as the actuator and the armature approach each other due to the magnetic attraction force.

According to another aspect of the present disclosure, an electromagnetic clutch configured to transmit torque from an actuator to a driven device includes: an armature configured to come into contact with the actuator due to magnetic attraction force; an outer plate fixed to the armature, the outer plate being located on an opposite side of the armature from the actuator, the outer plate being configured to rotate together with the armature; an inner hub located between the armature and the outer plate to be movable in a direction along a rotation axis, the inner hub being engaged with the armature or the outer plate with respect to a direction of rotation, the inner hub being fixed to the driven device; and a rubber member disposed between the inner hub and the outer plate to give an urging force to the inner hub and the outer plate in a direction away from each other. The rubber member includes a thin portion defining a clearance with the inner hub or the outer plate in a state where the magnetic attraction force is not generated between the actuator and the armature, and a sealing portion protruding from the thin portion to contact the inner hub or the outer plate so as to limit water from entering an inside from an outside through the clearance.

According to another aspect of the present disclosure, an electromagnetic clutch configured to transmit torque from an actuator to a driven device includes: an armature configured to come into contact with the actuator due to magnetic attraction force; an outer plate fixed to the armature, the outer plate being located on an opposite side of the armature from the actuator, the outer plate being configured to rotate together with the armature; an inner hub located between the armature and the outer plate to be movable in a direction along a rotation axis, the inner hub being engaged with the armature or the outer plate with respect to a direction of rotation, the inner hub being fixed to the driven device; a rubber member disposed between the inner hub and the outer plate to give an urging force to the inner hub and the outer plate in a direction away from each other; and a flange portion having an annular shape and protruding radially outward from a gap between the armature and the outer plate to cover the gap between the actuator and the armature.

BRIEF DESCRIPTION OF THE DRAWINGS

FIG. 8 is a diagram for explaining the operation of the electromagnetic clutch according to at least one embodiment of the present disclosure.

FIG. 9 is a diagram for explaining the operation of the electromagnetic clutch according to at least one embodiment of the present disclosure.

EMBODIMENTS

Comparative Examples

Figure 1:
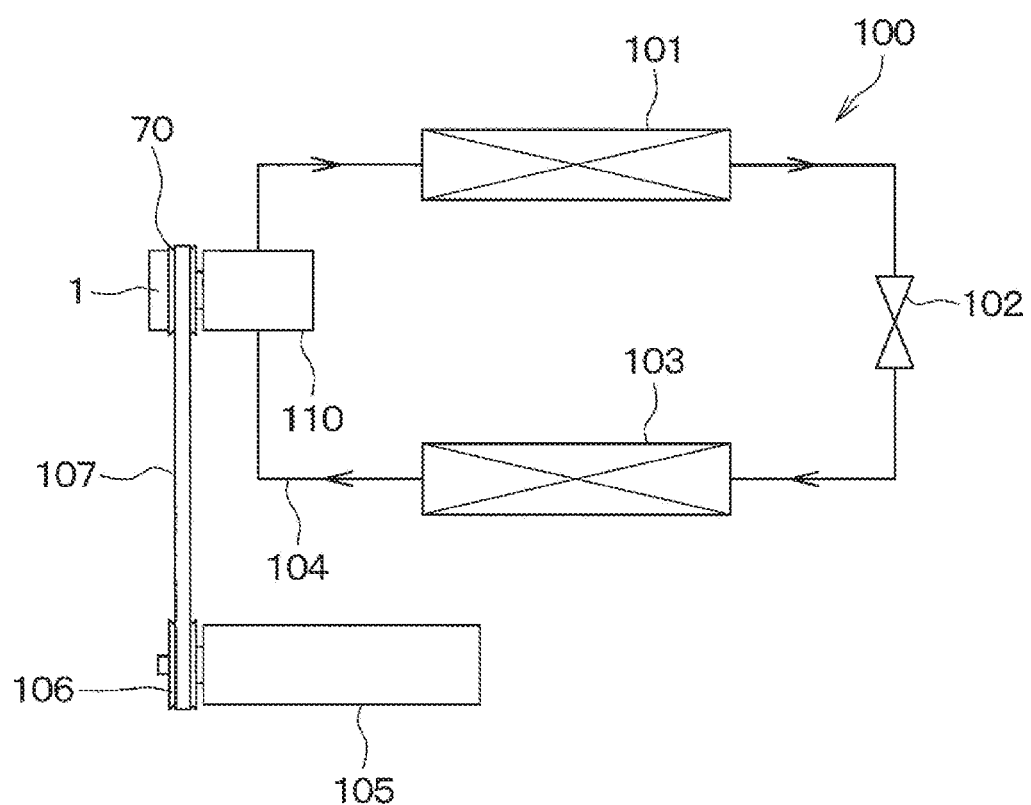
FIG. 1 is a diagram illustrating a refrigeration cycle in which an electromagnetic clutch of at least one embodiment of the present disclosure is used.

An electromagnetic clutch of a first comparative example includes an armature facing a rotor that is an actuator, an inner hub fixed to a shaft of a compressor that is a driven device, and a metal plate spring connecting the armature and the inner hub. The plate spring urges the rotor and the armature in a direction away from each other.

In this electromagnetic clutch, when a coil disposed inside the rotor is energized, magnetic attraction force generated by the coil draws the armature toward the rotor against the urging force of the plate spring, and thus the rotor and the armature are joined together by frictional force. Then, the electromagnetic clutch rotates together with the rotor to transmit torque from the rotor to the compressor. When the coil is unenergized and the magnetic attraction force disappears, the urging force of the plate spring causes the armature to move away from the rotor, and the torque transmission from the rotor to the compressor is stopped.

In this electromagnetic clutch, while the rotor and the armature are approaching each other due to the magnetic attraction force generated by the coil in the rotor, the plate spring elastically deforms in a rotation axis direction and a circumferential direction. Accordingly, the urging force of the plate spring non-linearly increases with increase of displacement amount of the armature, and the collision speed of the rotor and the armature is reduced. Accordingly, this electromagnetic clutch can suppress the collision noise (i.e. clutch noise) caused when the armature collides with the actuator.

An electromagnetic clutch of a second comparative example includes an armature facing a rotor, an inner hub fixed to a shaft of a compressor, and a rubber member connecting a hub plate fixed to the armature and the inner hub in the radial direction.

Also in this electromagnetic clutch, when a coil disposed inside the rotor is energized, magnetic attraction force generated by the coil draws the armature toward the rotor against the urging force of the rubber member, and thus the rotor and the armature are joined together by frictional force. Then, the electromagnetic clutch rotates together with the rotor to transmit torque from the rotor to the compressor. When the coil is unenergized and the magnetic attraction force disappears, the urging force of the rubber member causes the armature to move away from the rotor, and the torque transmission from the rotor to the compressor is stopped.

This electromagnetic clutch can reduce, by the elastic force of the rubber member, fluctuations in torsional torque between the inner hub, the outer plate, and the armature caused during the torque transmission. Accordingly, this electromagnetic clutch can reduce the noise vibration during the torque transmission.

In the electromagnetic clutch of the first comparative example, the armature and the inner hub are connected by the plate spring. Accordingly, in this electromagnetic clutch, it may be difficult to absorb, by the plate spring, fluctuations in the torsional torque generated between the outer plate, the outer plate, and the inner hub during the torque transmission. Accordingly, the noise vibration during the torque transmission in this electromagnetic clutch may be large.

In the electromagnetic clutch of the second comparative example, since the hub plate fixed to the armature and the inner hub are connected in the radial direction by the rubber member, the urging force of the rubber member linearly increases while the coil is energized and the rotor and the armature approach each other. Accordingly, in this electromagnetic clutch, the collision speed of the rotor and the armature may not be reduced, and large clutch noise may be generated.

Embodiments of the present disclosure will now be described with reference to the drawings. Parts that are identical or equivalent to each other in the following embodiments are assigned the same reference numerals and will not be described.

First Embodiment

A first embodiment will be described. As shown in FIG. 1, an electromagnetic clutch of the present embodiment is a torque transmission device configured to intermittently transmit torque from a rotor 70 that is an actuator to a compressor 110 that is a driven device.

First, a refrigeration cycle 100 in which the compressor 110 that is a driven device is disposed will be described. The refrigeration cycle 100 is used in a vehicular air-conditioning device (not shown) for air-conditioning of a passenger compartment, a container, or the like. The refrigeration cycle 100 is a closed circuit in which the compressor 110, a radiator 101, an expansion valve 102, and an evaporator 103 are annularly connected to each other through refrigerant pipes 104. The compressor 110 is configured to draw in a refrigerant from the refrigerant pipe 104 connected to the evaporator 103, compress the refrigerant, and discharge the refrigerant. The radiator 101 is a heat exchanger configured to cause the refrigerant discharged from the compressor 110 to release heat to an outside air. The expansion valve 102 is configured to depressurize and expand the refrigerant flowing out of the radiator 101. The evaporator 103 is a heat exchanger configured to evaporate the refrigerant, which was depressurized and expanded by the expansion valve 102, by exchanging heat with air that is to be conveyed to the passenger compartment or a container.

A fixed capacity type compressor such as a scroll type and a vane type compressor, or a variable capacity type compressor such as a swash plate type compressor may be used as the compressor 110. The rotor 70 that is an actuator is located on one side of the compressor 110. The rotor 70 is rotatable relatively to a housing and the like of the compressor 110.

An engine 105 is mounted on the vehicle as a power source. The engine 105 is used as a power source for the compressor 110 and as a power source for running the vehicle. A pulley 106 connected to a shaft of the engine 105 and the rotor 70 are connected with each other through a belt 107 for power transmission. Torque output from the engine 105 is transmitted to the rotor 70 through the pulley 106 and the belt 107. Accordingly, the rotor 70 rotates together with the engine 105. The electromagnetic clutch 1 is located on the other side of the rotor 70 with respect to the compressor 110. The torque transmitted from the engine 105 to the rotor 70 is transmitted to the shaft of the compressor 110 through the electromagnetic clutch 1.

Next, the rotor 70 will be described with reference to FIGS. 2, 4. The rotor 70 is made of a ferromagnetic material such as iron. The rotor 70 has a V-shaped groove portion 72 on an outer periphery 71. The V-shaped portion 72 includes multiple grooves each having a V-shaped cross section. The belt 107 for transmitting the torque output from the engine 105 is stretched around the V-shaped groove portion 72. An outer ring 81 of a bearing 80 is fixed to an inner peripheral part 73 of the rotor 70. An inner ring 82 of the bearing 80 is fixed to a cylinder portion 112 cylindrically protruding from the housing of the compressor 110. As a result, the rotor 70 is rotatable relative to the housing of the compressor 110.

An end surface 74 of the rotor 70 facing away from the compressor 110 is a friction surface for contacting an armature 11 of the electromagnetic clutch 1. In the following description, the friction surface will be referred to as the end surface 74 of the rotor 70. A friction member is disposed on a part of the end surface 74 of the rotor 70 for increasing the friction coefficient. As the friction member, a non-magnetic material such as one obtained by solidifying alumina with resin or a sintered body of metal powder such as aluminum is adopted.

A stator 90 is disposed in the rotor 70. The stator 90 includes a stator housing 91 and a coil 92. The stator housing 91 is made of ferromagnetic material such as resin and has an annular shape. The coil 92 is covered with insulating resin material and fixed to an inside of the stator housing 91. When the coil 92 of the stator 90 is energized, magnetic flux flows in the magnetic circuit formed by the stator housing 91, the rotor 70, and the armature 11 of the electromagnetic clutch 1 described later. As a result, the stator 90 generates a magnetic attraction force that draws the armature 11 toward the rotor 70.

Next, the electromagnetic clutch 1 will be described.

Figure 2:
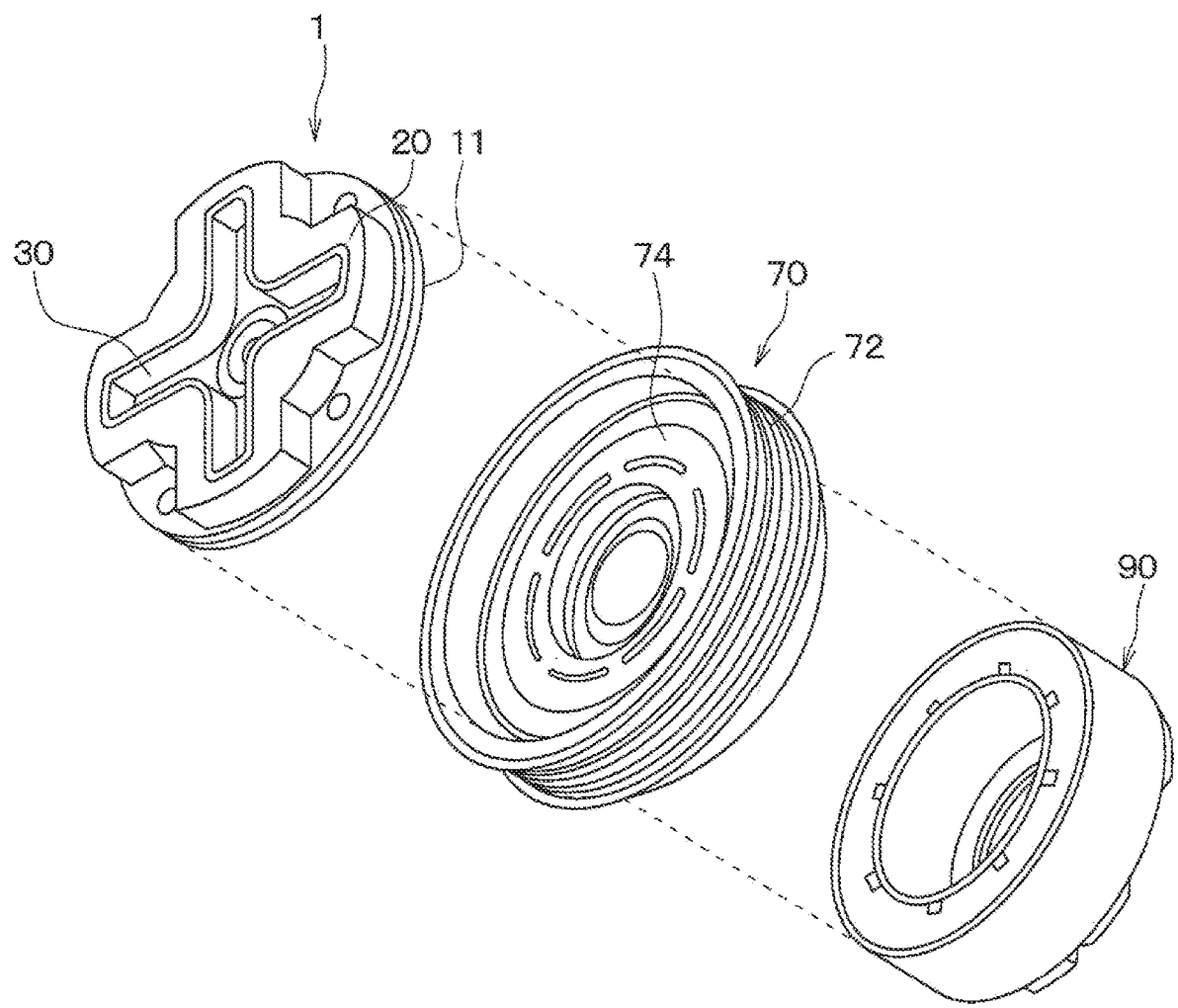
FIG. 2 is an exploded perspective view showing the electromagnetic clutch and a rotor according to at least one embodiment of the present disclosure.
Figure 3:
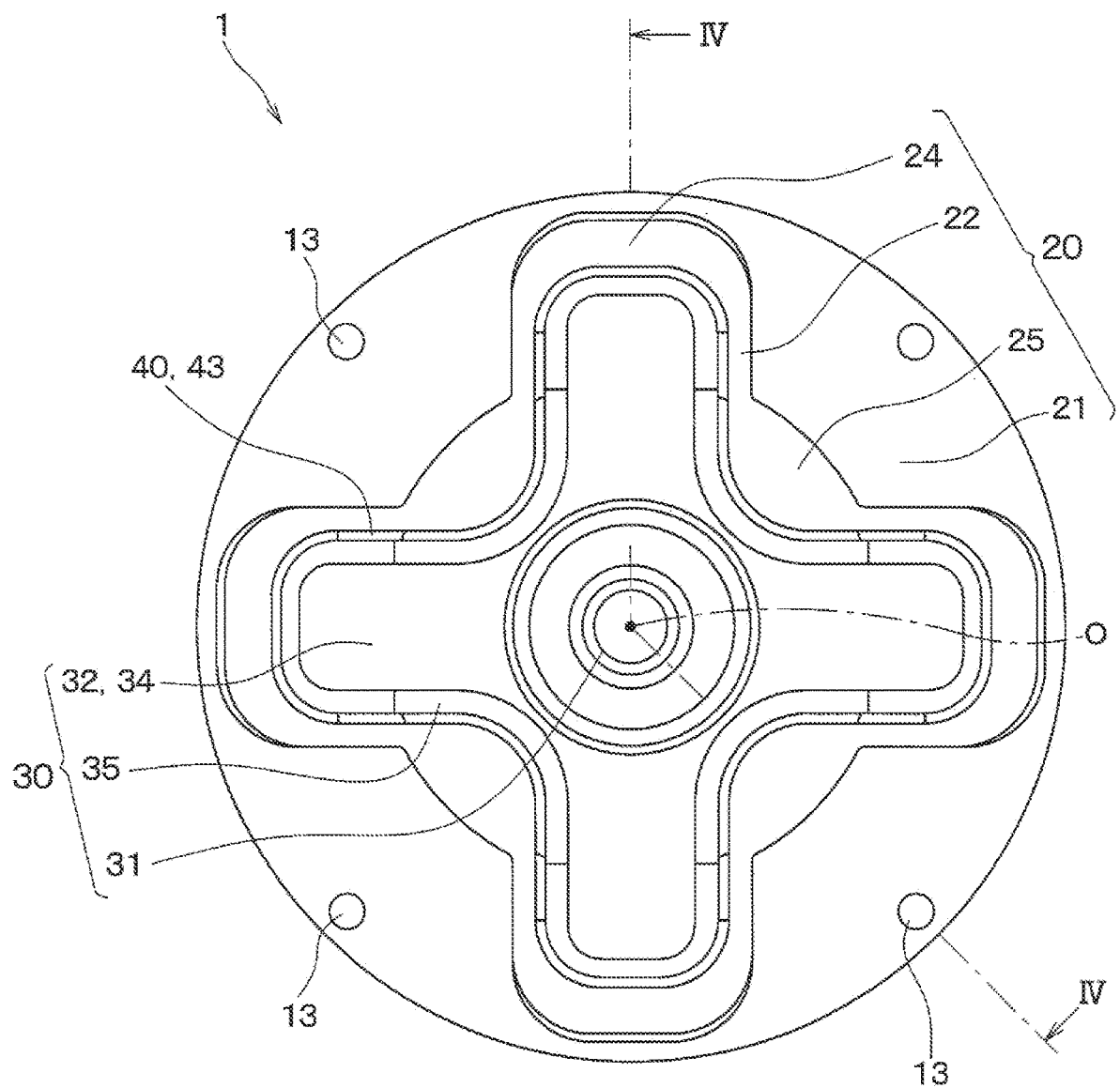
FIG. 3 is a plan view of the electromagnetic clutch according to at least one embodiment of the present disclosure.
Figure 4:
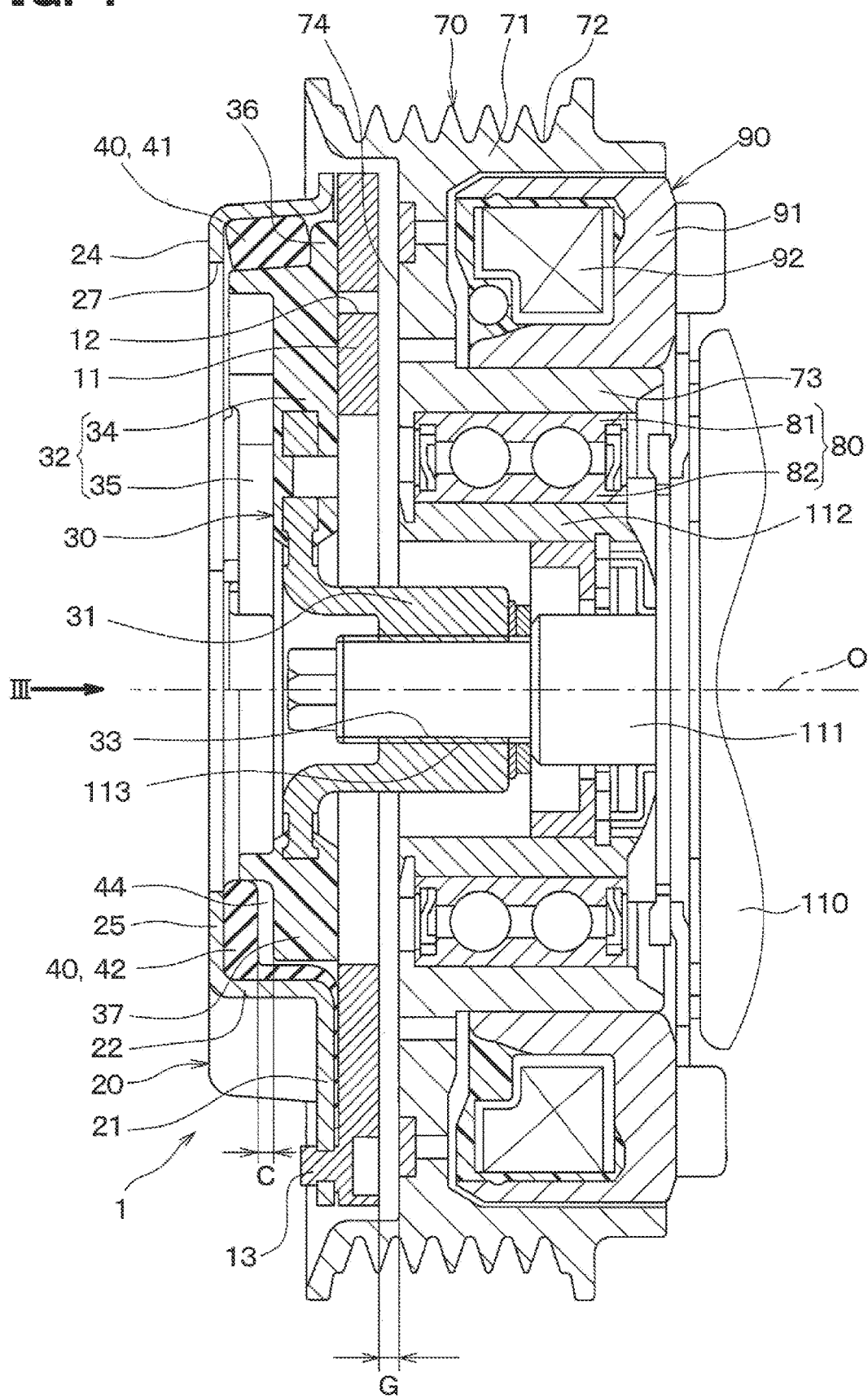
FIG. 4 is a cross-sectional diagram of the electromagnetic clutch and the rotor taken along IV-IV line of FIG. 3.
Figure 5:
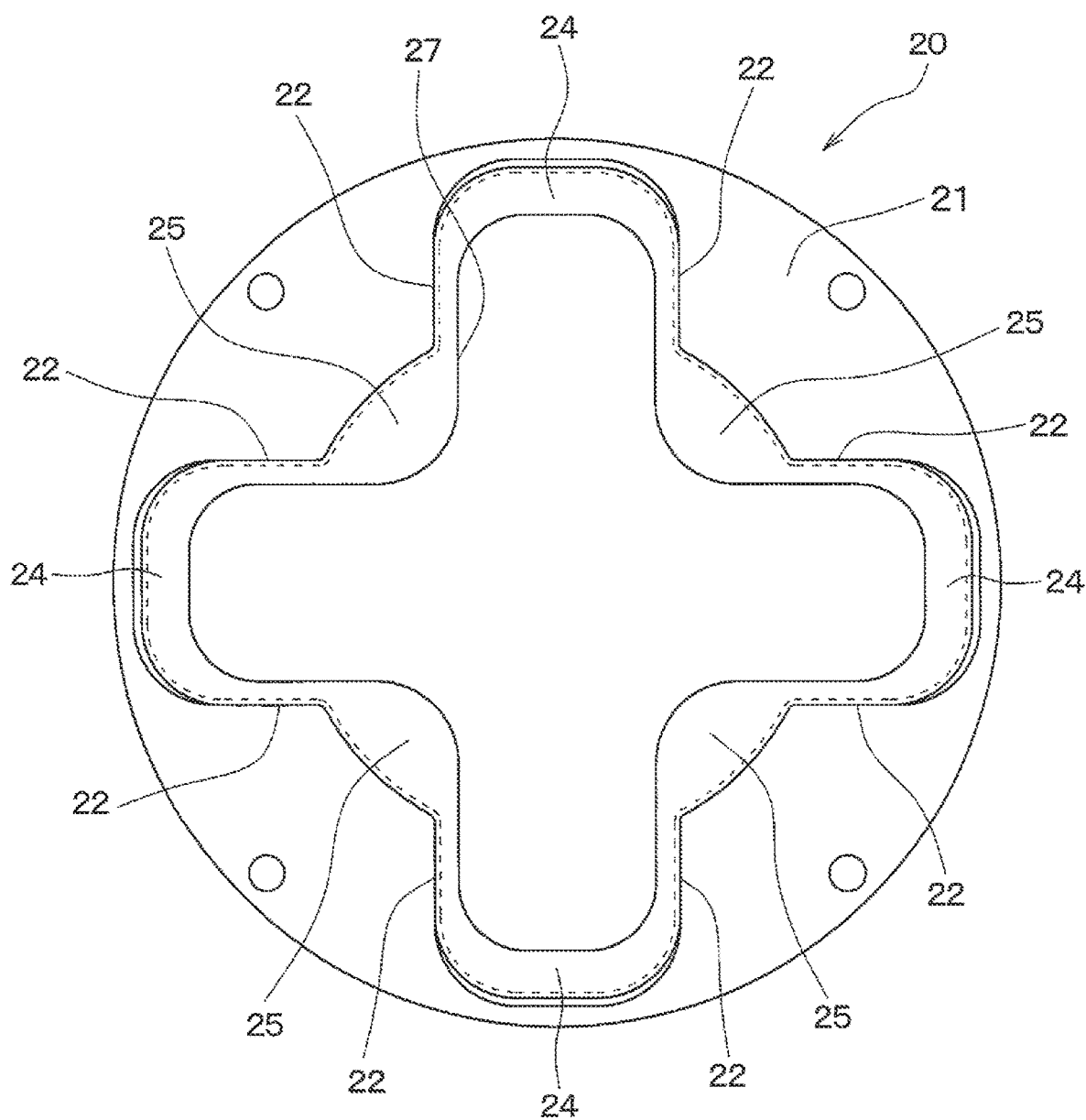
FIG. 5 is a plan view illustrating an outer plate of the electromagnetic clutch according to at least one embodiment of the present disclosure.

As shown in FIGS. 2-4, the electromagnetic clutch 1 includes the armature 11, an outer plate 20, an inner hub 30, a rubber member 40, and the like.

The armature 11 is formed in an annular shape from a ferromagnetic material such as iron, and is arranged to face the end surface 74 of the rotor 70. A predetermined clearance (for example, about 0.5 mm) is formed between the armature 11 and the end surface 74 of the rotor 70 when the coil 92 of the stator 90 is not energized. It should be noted that the clearance between the armature 11 and the rotor 70 is shown to be relatively large in the drawings for the sake of explanation.

When the coil 92 of the stator 90 is energized, the armature 11 is drawn toward the rotor 70 by the magnetic attraction force generated by the stator 90, and thus the armature 11 comes into contact with the rotor 70. The armature 11 is joined with the end surface 74 of the rotor 70 by frictional force. In this state, the electromagnetic clutch 1 rotates together with the rotor 70. In FIG. 4, a rotation axis of the electromagnetic clutch 1 is indicated by a one-dot chain line with reference mark O. A groove 12 for magnetic shield which extends in an arc shape in the circumferential direction of the armature 11 is formed at a middle part of the armature 11 in the radial direction.

As shown in FIGS. 2-5, the outer plate 20 is fixed to the outer peripheral portion of the armature 11 by a fixation member such as rivet 13. The outer plate 20 rotates together with the armature 11. The outer plate 20 includes, as a part of the outer plate 20, a base plate portion 21 extending along the armature 11, an outside standing plate portion 22 extending from the base plate portion 21 in the rotation axis direction, and a top plate portion 24, 25 connected to an end of the outside standing plate portion 22 which is the end opposite from the other end of the outside standing plate portion 22 connected to the base plate portion 21.

The top plate portion 24, 25 is substantially parallel to the armature 11. The top plate portion 24, 25 is provided with an opening 27 that has a plus sign shape when viewed in the axial direction. The outside standing plate portion 22 and the top plate portion 24, 25 are formed to define the plus sign shaped opening 27. In the following description, a part of the top plate portion 24, 25 located outside the plus sign shaped opening 27 in the radial direction is referred to as an outside top plate portion 24, and the remaining parts located inside the plus sign shaped opening 27 in the radial direction is referred to as an inside top plate portion 25. The inside top plate portion 25 has an arc shape. That is, the top plate portion 24, 25 includes the outside top plate portion 24 and the inside top plate portion 25.

Figure 6:
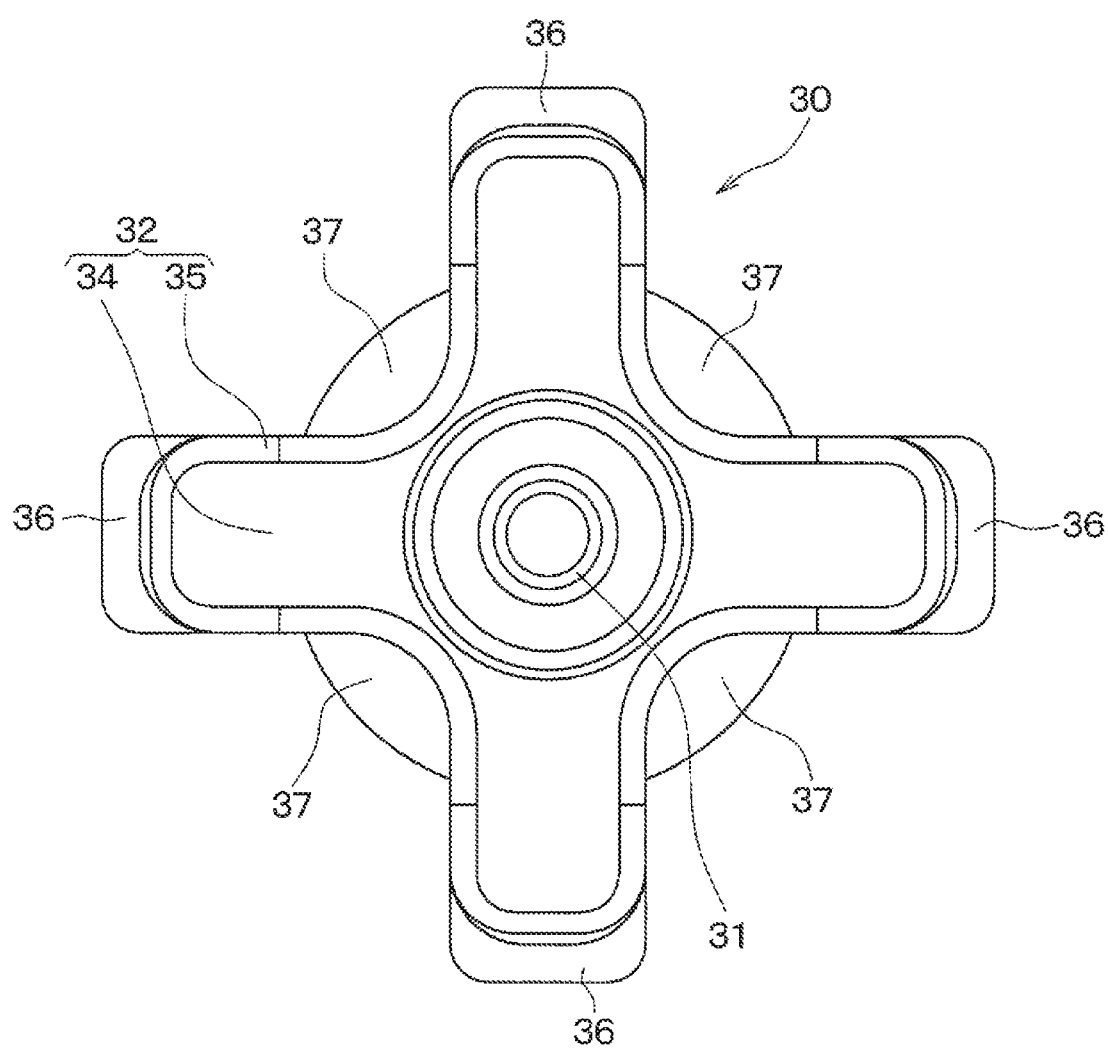
FIG. 6 is a plan view illustrating an inner hub of the electromagnetic clutch according to at least one embodiment of the present disclosure.

As shown in FIGS. 3, 4, 6, the inner hub 30 includes a boss portion 31 having a cylindrical shape, and a plate portion 32 extending outward in the radial direction from an end of the boss portion 31. The boss portion 31 and a radially inner part of the plate portion 32 are made of metal. A radially outer part of the plate portion 32 is made of resin. The metal part and the resin part of the inner hub 30 are integrally formed by insert molding. Specifically, the resin part is inserted into holes or recesses of the metal part, and accordingly the metal part and the resin part are firmly joined with each other.

Female threads 33 are formed on an inner surface of the boss portion 31. The female threads 33 on the inner surface of the boss portion 31 is engaged with male threads 113 formed on an outer surface of the shaft 111 of the compressor 110, and accordingly the inner hub 30 is fixed to an end part of the shaft 111 of the compressor 110.

The plate portion 32 of the inner hub 30 is located inside the outside standing plate portion 22 of the outer plate 20, and is located between the top plate portion 24, 25 of the outer plate 20 and the armature 11. For this reason, the plate portion 32 of the inner hub 30 has a substantially plus sign shape. The inner hub 30 is movable in the rotation axis direction relatively to the outer plate 20 and the armature 11.

The plate portion 32 of the inner hub 30 includes, as a part of the plate portion 32, a bottom plate portion 34 that is parallel to the armature 11, and an inside standing plate portion 35 extending from the bottom plate portion 34 in the rotation axis direction. The inside standing plate portion 35 of the inner hub 30 is located inside the outside standing plate portion 22 of the outer plate 20 and extends along the outside standing plate portion 22. Accordingly, the inner hub 30 is engaged with the outer plate 20 with respect to the rotation direction and rotates together with the outer plate 20 and the armature 11.

The plate portion 32 of the inner hub 30 further includes an outside receiving rubber portion 36 facing the outside top plate portion 24 of the outer plate 20, and an inside receiving rubber portion 37 facing the inside top plate portion 25 of the outer plate 20.

The outside receiving rubber portion 36 of the inner hub 30 is spaced from the outside top plate portion 24 of the outer plate 20 by a predetermined clearance. The inside receiving rubber portion 37 of the inner hub 30 is spaced from the inside top plate portion 25 of the outer plate 20 by a predetermined clearance. The inside standing plate portion 35 of the inner hub 30 is spaced from the outside standing plate portion 22 of the outer plate 20 by a predetermined clearance.

Figure 7:
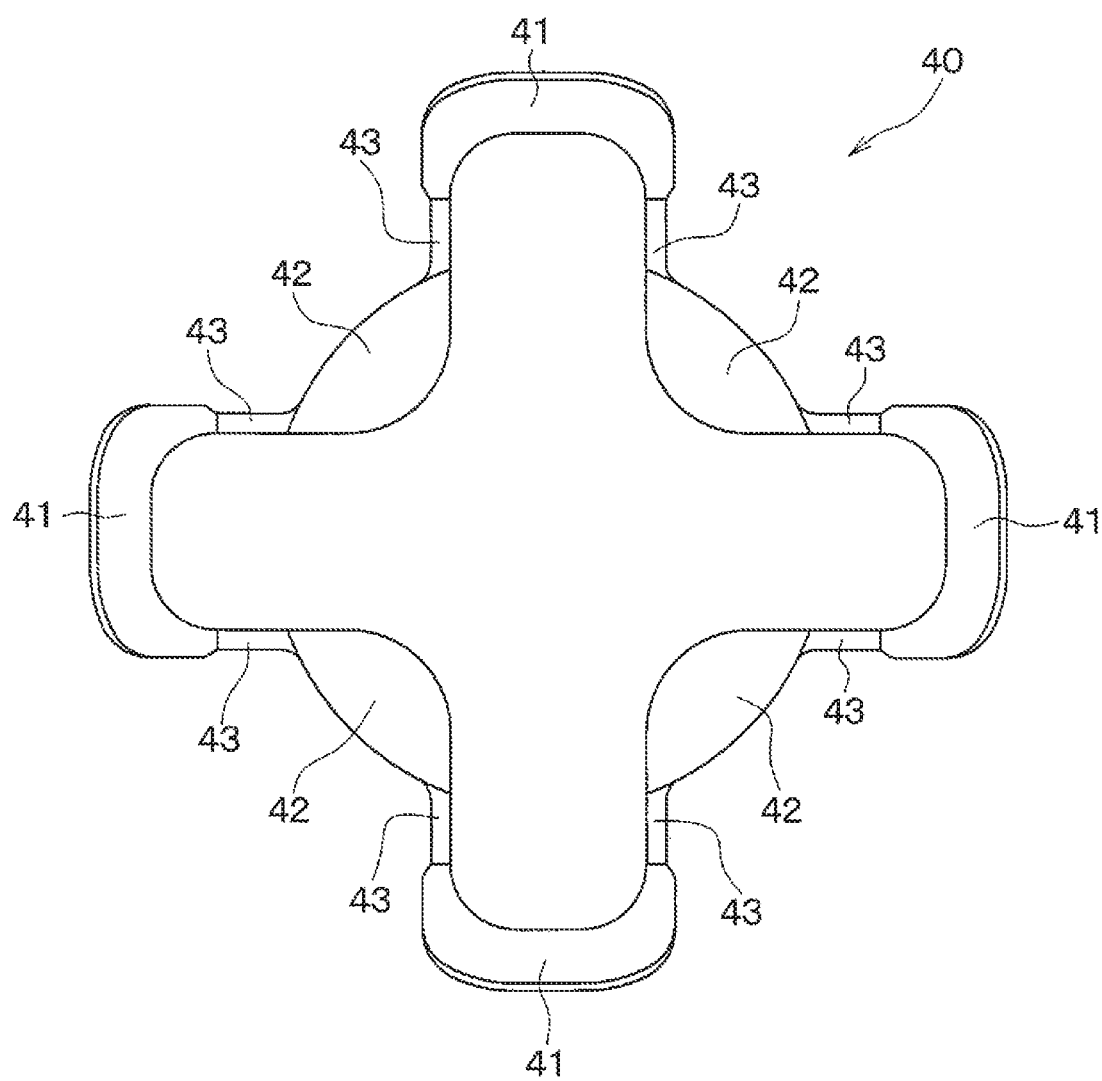
FIG. 7 is a plan view illustrating a rubber member of the electromagnetic clutch according to at least one embodiment of the present disclosure.

As shown in FIGS. 3, 4, 7, the rubber member 40 has a shape corresponding to the space between the inner hub 30 and the outer plate 20. The rubber member 40 is fitted between the inner hub 30 and the outer plate 20 in a compressed state. Accordingly, the rubber member 40 gives an urging force to the inner hub 30 and the outer plate 20 in a direction away from each other due to a predetermined elastic force. Accordingly, when the coil 92 of the stator 90 is not energized, the armature 11 is spaced from the end surface 74 of the rotor 70 as shown in FIG. 4. In contrast, when the coil 92 of the stator 90 is energized, the armature 11 is drawn to the end surface 74 of the rotor 70 by the magnetic attraction force generated by the stator 90 against the urging force of the rubber member 40. In the following description, a state in which the coil 92 of the stator 90 is not energized is referred to as an "unenergized state", and a state in which the coil 92 of the stator 90 is energized is referred to as an "energized state".

The rubber member 40 includes a thick portion 41, a thin portion 42, and a connecting portion 43. The thick portion 41 is fitted between the outside receiving rubber portion 36 of the inner hub 30 and the outside top plate portion 24 of the outer plate 20. In the unenergized state, the thick portion 41 is in contact with the outside receiving rubber portion 36 of the inner hub 30 and the outside top plate portion 24 of the outer plate 20. That is, in both the energized state and the unenergized state, the thick portion 41 is in contact with the outside receiving rubber portion 36 of the inner hub 30 and the outside top plate portion 24 of the outer plate 20, and the thick portion 41 continuously gives the urging force to the inner hub 30 and the outer plate 20 in the direction away from each other.

The thin portion 42 is located between the inside receiving rubber portion 37 of the inner hub 30 and the inside top plate portion 25 of the outer plate 20. In the unenergized state, the thickness of the thin portion 42 in the rotation axis direction is less than a distance from the inside receiving rubber portion 37 to the inside top plate portion 25. Accordingly, a predetermined clearance 44 is formed between the inside receiving rubber portion 37 and the thin portion 42 in the unenergized state. A size C of the clearance 44 between the inside receiving rubber portion 37 and the thin portion 42 is set to be less than a distance G from the rotor 70 to the armature 11. Accordingly, after the coil 92 of the rotor 70 starts to be energized, the clearance 44 between the inside receiving rubber portion 37 and the thin portion 42 disappears while the rotor 70 and the armature 11 approach each other by the magnetic attraction force. Accordingly, the thin portion 42 comes into contact with both the inside receiving rubber portion 37 of the inner hub 30 and the inside top plate portion 25 of the outer plate 20 while the rotor 70 and the armature 11 approach each other. As a result, the thin portion 42 starts giving the urging force to the inner hub 30 and the outer plate 20 in a direction away from each other when the thin portion 42 comes into contact with them.

The connecting portion 43 is fitted between the inside standing plate portion 35 of the inner hub 30 and the outside standing plate portion 22 of the outer plate 20. The connecting portion 43 is located between the inner hub 30 and the outer plate 20. The connecting portion 43 buffers fluctuations of the torque and transmits the torque from the outer plate 20 to the inner hub 30 while the torque is transmitted from the rotor 70 to the compressor 110. Accordingly, when the rotor 70 rotates in the energized state, the torque is transmitted to, in order, the rotor 70, the armature 11, the outer plate 20, the rubber member 40, the inner hub 30, and the shaft 111.

Next, the operation of the electromagnetic clutch 1 when the state is switched from the unenergized state to the energized state will be described with reference to FIGS. 8-10.

As shown in FIG. 8, the predetermined clearance 44 is defined between the thin portion 42 and the inside receiving rubber portion 37 of the inner hub 30 in the unenergized state.

When the energization of the coil 92 of the rotor 70 is started, the rotor 70 and the armature 11 approach each other by the magnetic attraction force. As shown in FIG. 9, the clearance 44 between the inside top plate portion 42 and the thin portion 42 disappears while the rotor 70 and the armature 11 approach each other, and the thin portion 42 comes into contact with the inside receiving rubber portion 37 of the inner hub 30 and the inside top plate portion 25 of the outer plate 20.

Figure 10:
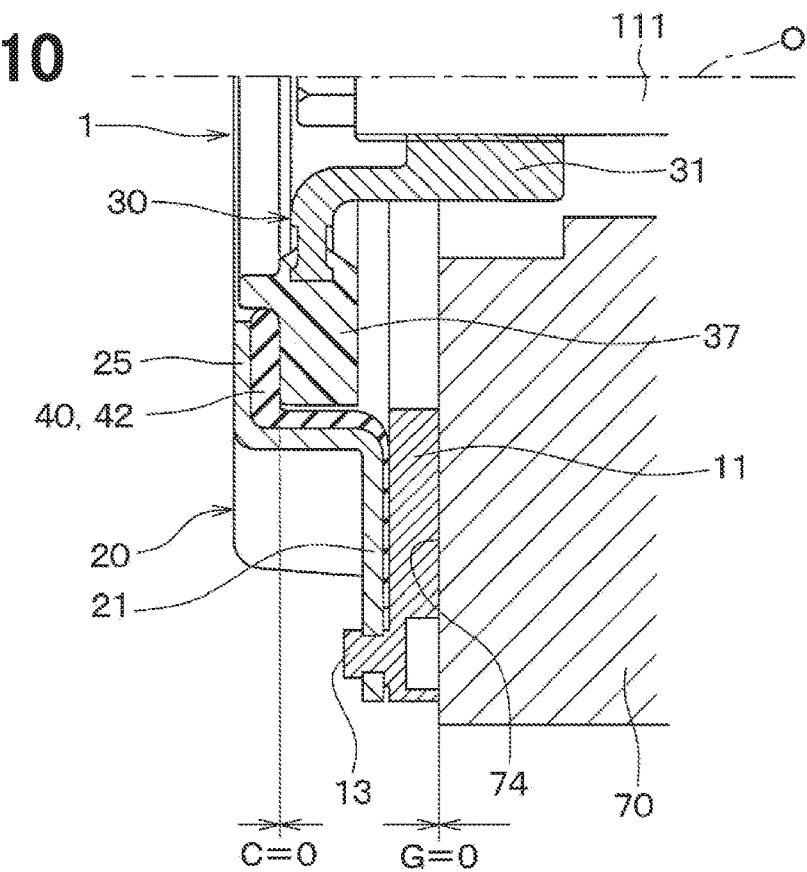
FIG. 10 is a diagram for explaining the operation of the electromagnetic clutch according to at least one embodiment of the present disclosure.

Subsequently, the thin portion 42 is compressed in the rotation axis direction until the rotor 70 and the armature 11 come into contact with each other as shown in FIG. 10. Accordingly, the thin portion 42 gives the urging force to the inner hub 30 and the outer plate 20 in a direction away from each other.

Although not shown, both in the unenergized state and in a state where the rotor 70 and the armature 11 contact with each other, the thick portion 41 is in contact with the outside receiving rubber portion 36 of the inner hub 30 and the outside top plate portion 24 of the outer plate 20. The thick portion 41 is compressed in the rotation axis direction and continuously gives urging force to the inner hub 30 and the outer plate 20 in the direction away from each other.

Figure 11:
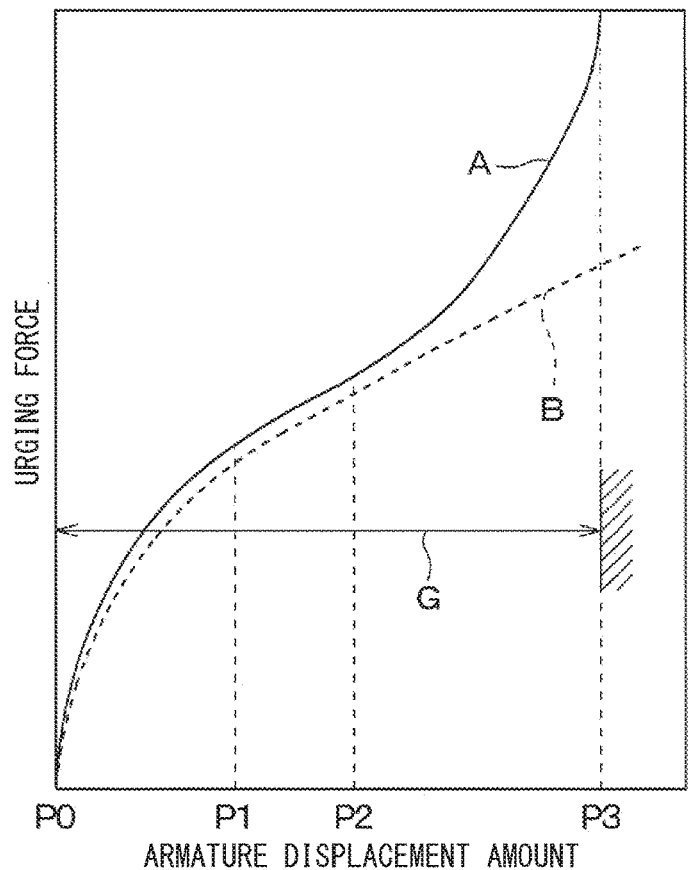
FIG. 11 is a characteristic diagram showing relationships between an urging force of the rubber member of the electromagnetic clutch and an armature displacement amount, according to at least one embodiment of the present disclosure.

FIG. 11 is a characteristic diagram showing an example of relationships between a displace amount of the armature 11 and the urging force of the rubber member 40 from the start of energization of the coil 92 to the timing when the rotor 70 and the armature 11 come into contact with each other.

A dashed line B in FIG. 11 indicates a change in the urging force in a case where the rubber member 40 only has the thick portion 41 and does not have the thin portion 42. In this case, the urging force of the rubber member 40 dramatically increases from a point P0, which represents the start of the energization, to a point P1, which represents the timing when an initial deformation of the thick portion 41 ends, and linearly increases from the point P1 to a point P3, which represents the timing when the rotor 70 and the armature 11 come into contact with each other. This is because the thick portion 41 of the rubber member 40 continuously gives the urging force to the outside receiving rubber portion 36 of the inner hub 30 and the outside top plate portion 24 of the outer plate 20 from the unenergized state to the timing when the rotor 70 and the armature 11 come into contact with each other.

In contrast, the solid line A indicates a change in the urging force in the case where the rubber member 40 includes the thick portion 41, the thin portion 42, and the connecting portion 43. In this case, the urging force of the rubber member 40 dramatically increases from the point P0, which represents the start of the energization, to the point P1, which represents the timing when an initial deformation of the thick portion 41 ends, and linearly increases with the increase of the deformation amount of the armature 11 from the point P1 to a predetermined point P2. Subsequently, the urging force of the rubber member 40 non-linearly increases from the predetermined point P2 to the point P3, which represents the timing when the rotor 70 and the armature 11 come into contact with each other. This is because the thin portion 42 of the rubber member 40 comes into contact with the inside receiving rubber portion 37 of the inner hub 30 and the inside top plate portion 25 of the outer plate 20 around the predetermined point P2 at which the rotor 70 and the armature 11 are approaching each other, and the thin portion 42 of the rubber member 40 starts giving the urging force to the inside receiving rubber portion 37 and the inside top plate portion 25. Accordingly, since the thin portion 42 and the thick portion 41 are compressed in the rotation axis direction from the predetermined point P2 at which the armature 11 is being displaced to the point P3 at which the rotor 70 and the armature 11 come into contact with each other, the urging force dramatically and non-linearly increases from the predetermined point P2.

The electromagnetic clutch 1 of the present embodiment described above has the following effects.

(1) In the present embodiment, the urging force of the rubber member 40 non-linearly increases as the rotor 70 and the armature 11 approach each other due to the magnetic attraction force. According to this, since the urging force of the rubber member 40 works as a resistance against the magnetic attraction force, the moving speed of the rotor 70 and the armature 11 decrease before the rotor 70 and the armature 11 come into contact with each other. Accordingly, the electromagnetic clutch 1 can suppress the collision noise (i.e. clutch noise) caused by the collision of the armature 11 and the rotor 70 at the start of torque transmission.

(2) In the present embodiment, the connecting portion 43 of the rubber member 40 is fitted between the inside standing plate portion 35 of the inner hub 30 and the outside standing plate portion 22 of the outer plate 20, and gives the urging force in the rotation direction to the inner hub 30 and the outer plate 20. Accordingly, the electromagnetic clutch 1 can reduce, by the elastic force of the connecting portion 43, the fluctuations in the torsional torque between the inner hub 30, the outer plate 20, and the armature 11 caused during the torque transmission. Accordingly, the electromagnetic clutch 1 can suppress the noise vibration during the torque transmission.

(3) In the present embodiment, the rubber member 40 includes the thick portion 41 and the thin portion 42. The thick portion 41 keeps contacting with the inner hub 30 and the outer plate 20 even in the unenergized state. In contrast, the thin portion 42 comes into contact with the inner hub 30 and the outer plate 20 immediately before the rotor 70 and the armature 11 come into contact with each other. That is, the rubber member 40 is configured such that an area where the rubber member 40 is in contact with the inner hub 30 or the outer plate 20 immediately before the rotor 70 and the armature 11 come into contact with each other is greater than an area where the rubber member 40 is in contact with the inner hub 30 or the outer plate 20 in the unenergized state. According to this, the electromagnetic clutch 1 can non-linearly increase the urging force of the rubber member 40 with the increase of the displacement amount of the armature 11.

(4) In the present embodiment, the size C of the clearance 44 between the inside receiving rubber portion 37 of the inner hub 30 and the thin portion 42 in the unenergized state is less than the distance G between the rotor 70 and the armature 11. According to this, the clearance 44 between the inside receiving rubber portion 37 of the inner hub 30 and the thin portion 42 can be disappeared while the rotor 70 and the armature approach with each other.

Second Embodiment

A second embodiment will be described. The second embodiment is different from the first embodiment in a part of the configurations of the outer plate 20 and the rubber member 40, and is similar to the first embodiment in other portions. Accordingly, only portions different from those of the first embodiment will be described.

Figure 12:
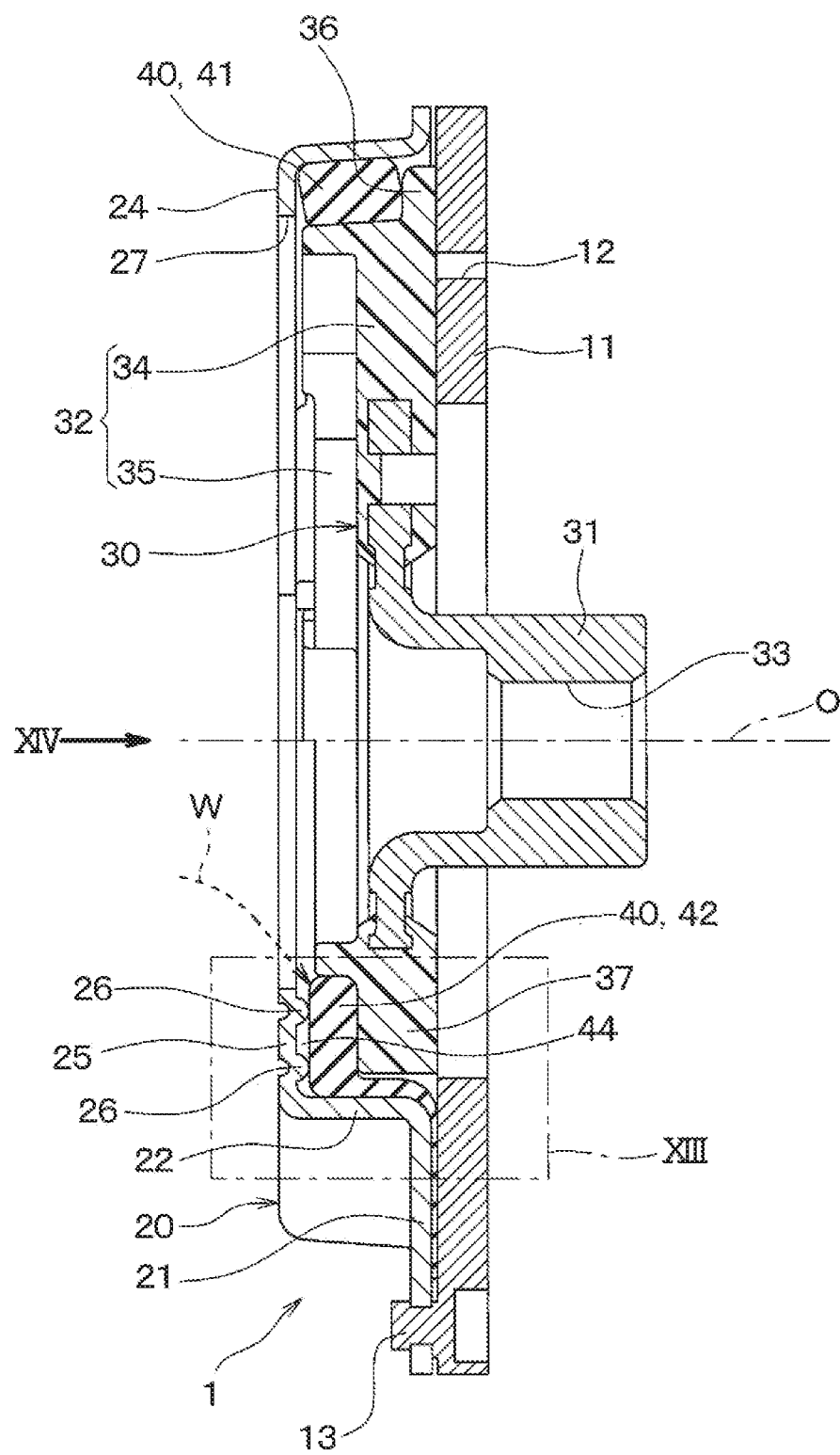
FIG. 12 is a cross-sectional diagram of an electromagnetic clutch according to at least one embodiment of the present disclosure.
Figure 13:
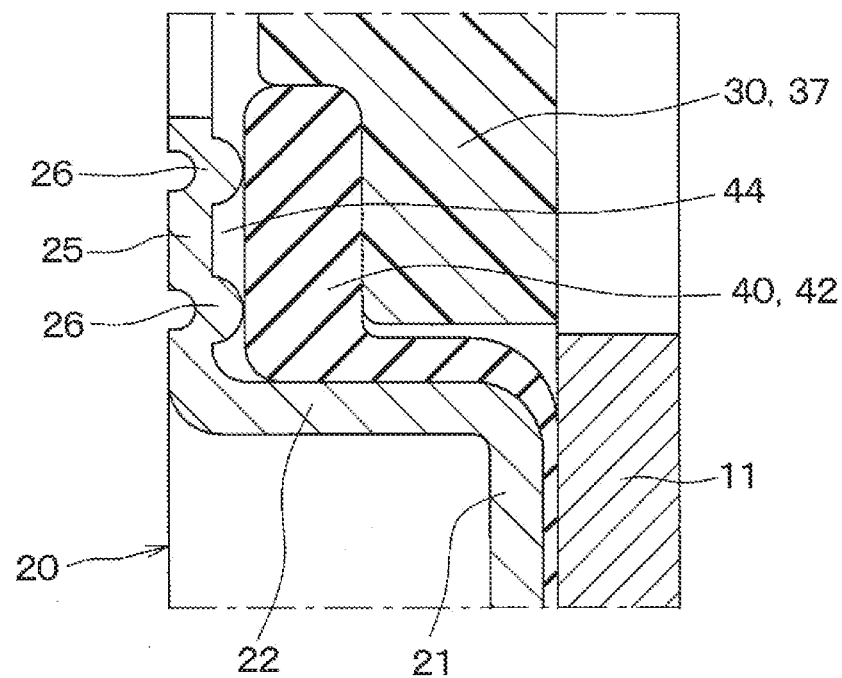
FIG. 13 is an enlarged view of XIII part of FIG. 12.
Figure 14:
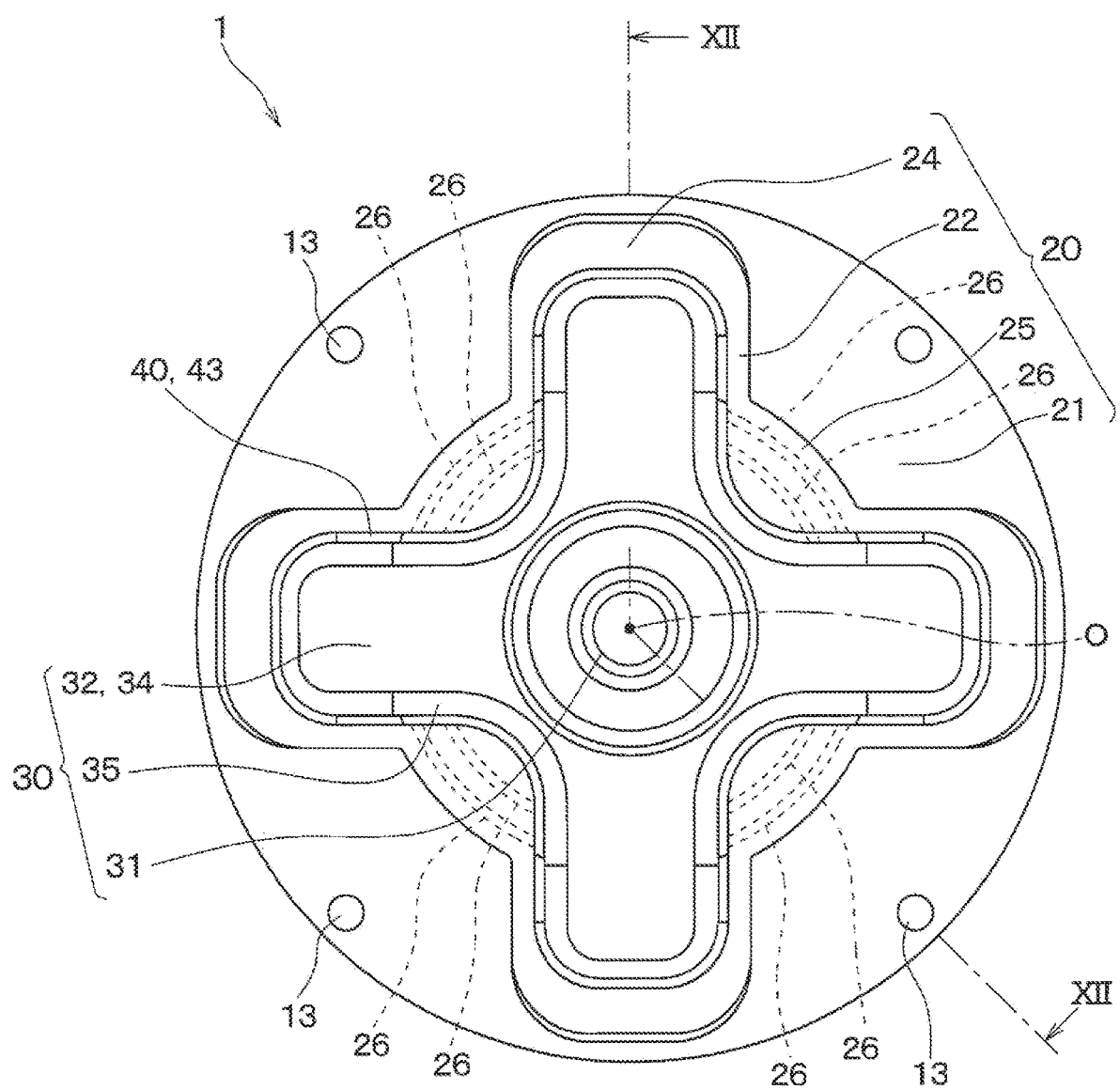
FIG. 14 is a plan view of the electromagnetic clutch according to at least one embodiment of the present disclosure.

As shown in FIGS. 12-14, in the second embodiment, the thin portion 42 of the rubber member 40 is in contact with the inside receiving rubber portion 37 of the inner hub 30 in the unenergized state. Accordingly, in the second embodiment, the predetermined clearance 44 is defined between the inside top plate portion 25 of the outer plate 20 and the thin portion 42. Also in the second embodiment, the size C of the clearance 44 is less than the distance G between the rotor 70 and the armature 11 as in the first embodiment.

In the second embodiment, the outer plate 20 has a protrusion 26 protruding from the inside top plate portion 25 toward the thin portion 42. In the following description, the protrusion 26 of the outer plate 20 will be referred to as an outer plate protrusion 26. The outer plate protrusion 26 protrudes from the inside top plate portion 25 into the clearance 44 between the inside top plate portion 25 and the thin portion 42. In the unenergized state, the outer plate protrusion 26 is in contact with the thin portion 42. Two outer plate protrusions 26 are formed to extend in the circumferential direction of the inside top plate portion 25.

Also in the second embodiment, the urging force of the rubber member 40 non-linearly increases as the rotor 70 and the armature 11 approach each other due to the magnetic attraction force as in the first embodiment. Accordingly, the electromagnetic clutch 1 can suppress the clutch noise caused at the start of the torque transmission.

If the clearance 44 is defined between the thin portion 42 and the inner hub 30 or the outer plate 20, it may be conceivable that outside water enters the inside through the clearance 44. If the water passes through the inside of the electromagnetic clutch 1 and the rotor 70 and the armature 11 get wet and rust occurs, so-called clutch slipping may occur, and accordingly the torque transmission performance of the electromagnetic clutch 1 may decrease. In FIG. 12, a path through which the water may enter from the outside of the electromagnetic clutch 1 is indicated by a dashed arrow W.

In view of the above-described points, according to the second embodiment, the outside water can be suppressed from entering the inside of the electromagnetic clutch 1 through the clearance 44 by the outer plate protrusion 26 even though the clearance 44 is defined between the outer plate 20 and the thin portion 42. Therefore, it is possible to prevent rust from being generated on the rotor 70 and the armature 11. Accordingly, the electromagnetic clutch 1 can suppress so-called clutch slipping and increase the reliability in torque transmission.

Third Embodiment

A third embodiment will be described. The third embodiment is different from the first embodiment in a part of the configurations of the inner plate and the rubber member 40, and is similar to the first embodiment in other portions. Accordingly, only portions different from those of the first embodiment will be described.

Figure 15:
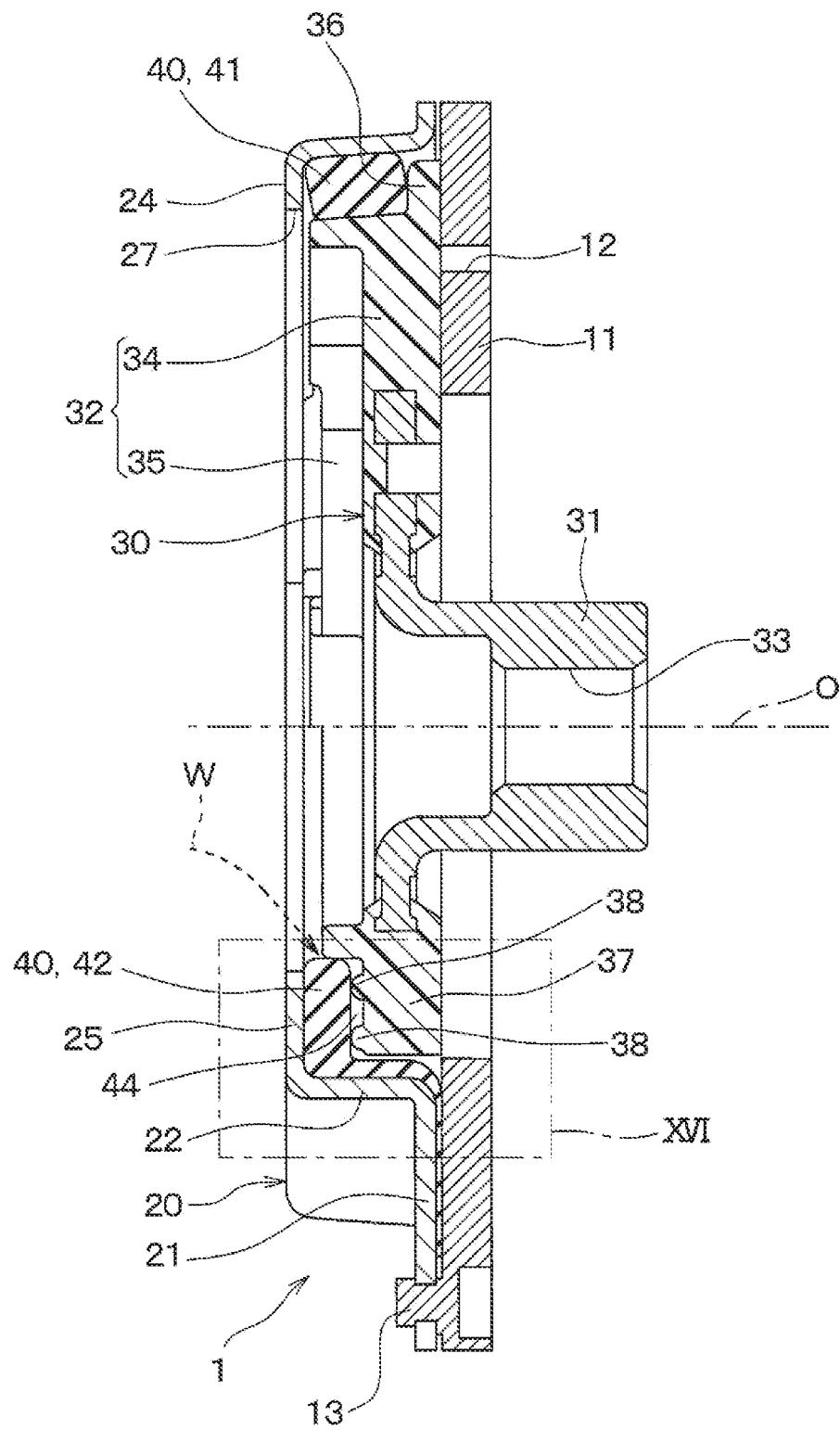
FIG. 15 is a cross-sectional diagram of an electromagnetic clutch according to at least one embodiment of the present disclosure.
Figure 16:
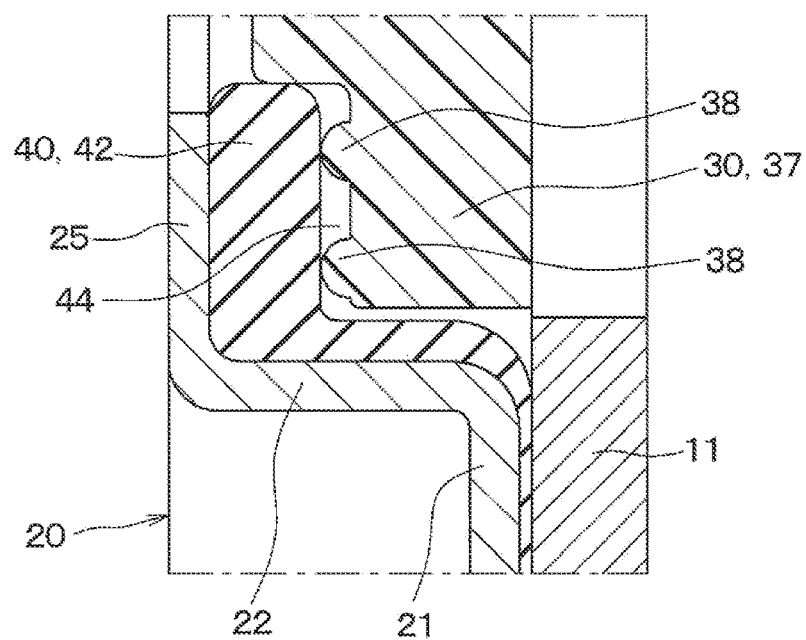
FIG. 16 is an enlarged view of XVI part of FIG. 15.
Figure 17:
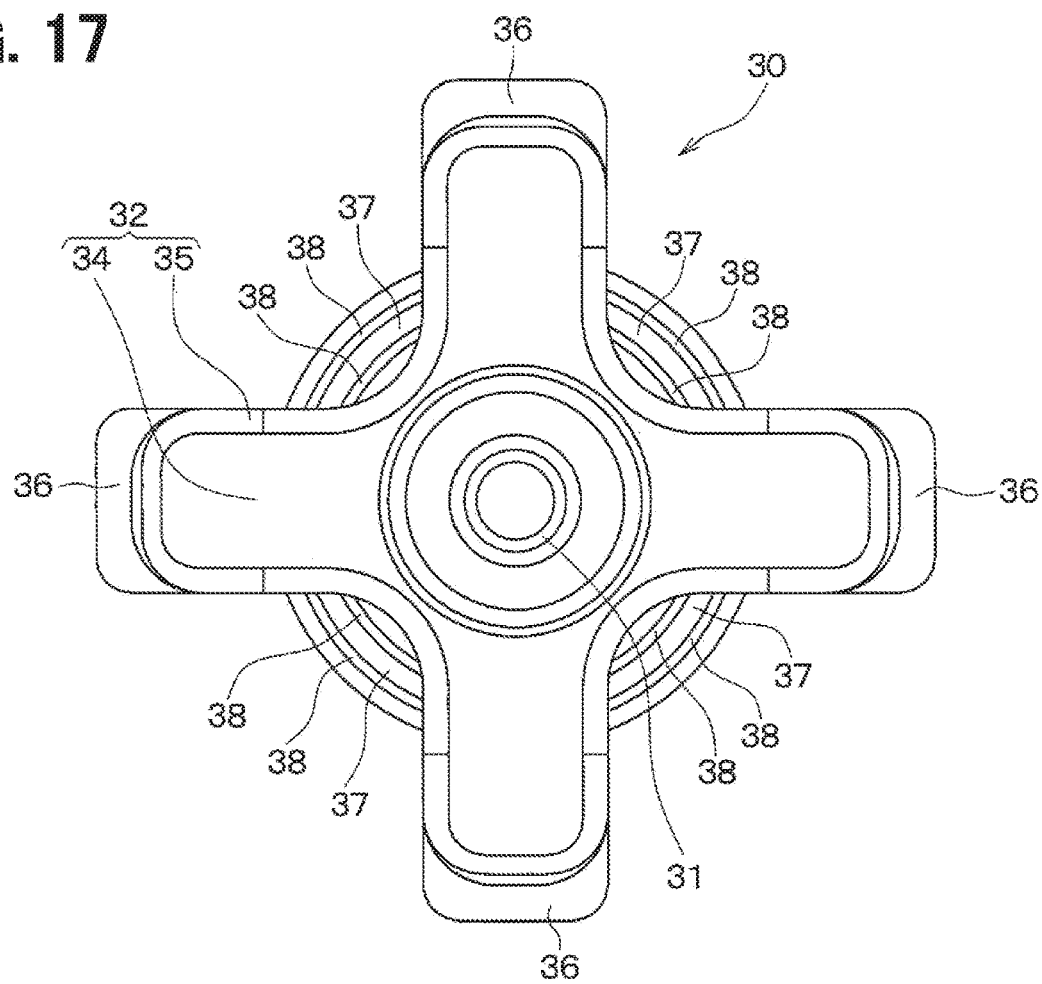
FIG. 17 is a plan view illustrating an inner hub of the electromagnetic clutch according to at least one embodiment of the present disclosure.

As shown in FIGS. 15-17, in the third embodiment, the predetermined clearance 44 is defined between the inside receiving rubber portion 37 of the inner hub 30 and the thin portion 42 of the rubber member 40 in the unenergized state as in the first embodiment. In the third embodiment, the inner hub 30 has a protrusion 38 protruding from the inside receiving rubber portion 37 toward the thin portion 42. In the following description, the protrusion 38 of the inner hub 30 is referred to as an inner hub protrusion 38. The inner hub protrusion 38 protrudes from the inside receiving rubber portion 37 into the clearance 44 between the inside receiving rubber portion 37 and the thin portion 42. In the unenergized state, the inner hub protrusion 38 is in contact with the thin portion 42. Two inner hub protrusions 38 are formed to extend in the circumferential direction of the inside receiving rubber portion 37.

Also in the third embodiment, the urging force of the rubber member 40 non-linearly increases as the rotor 70 and the armature 11 approach each other due to the magnetic attraction force as in the first embodiment. Accordingly, the electromagnetic clutch 1 can suppress the clutch noise caused at the start of the torque transmission.

According to the third embodiment, the outside water can be limited from entering the inside of the electromagnetic clutch 1 through the clearance 44 by the inner hub protrusion 38 even though the clearance 44 is defined between the inside receiving rubber portion 37 of the inner hub 30 and the thin portion 42. Therefore, it is possible to prevent rust from being generated on the rotor 70 and the armature 11. Accordingly, the electromagnetic clutch 1 of the third embodiment also can suppress so-called clutch slipping and increase the reliability in torque transmission.

Fourth Embodiment

A fourth embodiment will be described. In the fourth embodiment, the shape of the rubber member 40 is changed with respect to the first embodiment, and the other parts are similar to that in the first embodiment, so only the difference from the first embodiment will be described.

Figure 18:
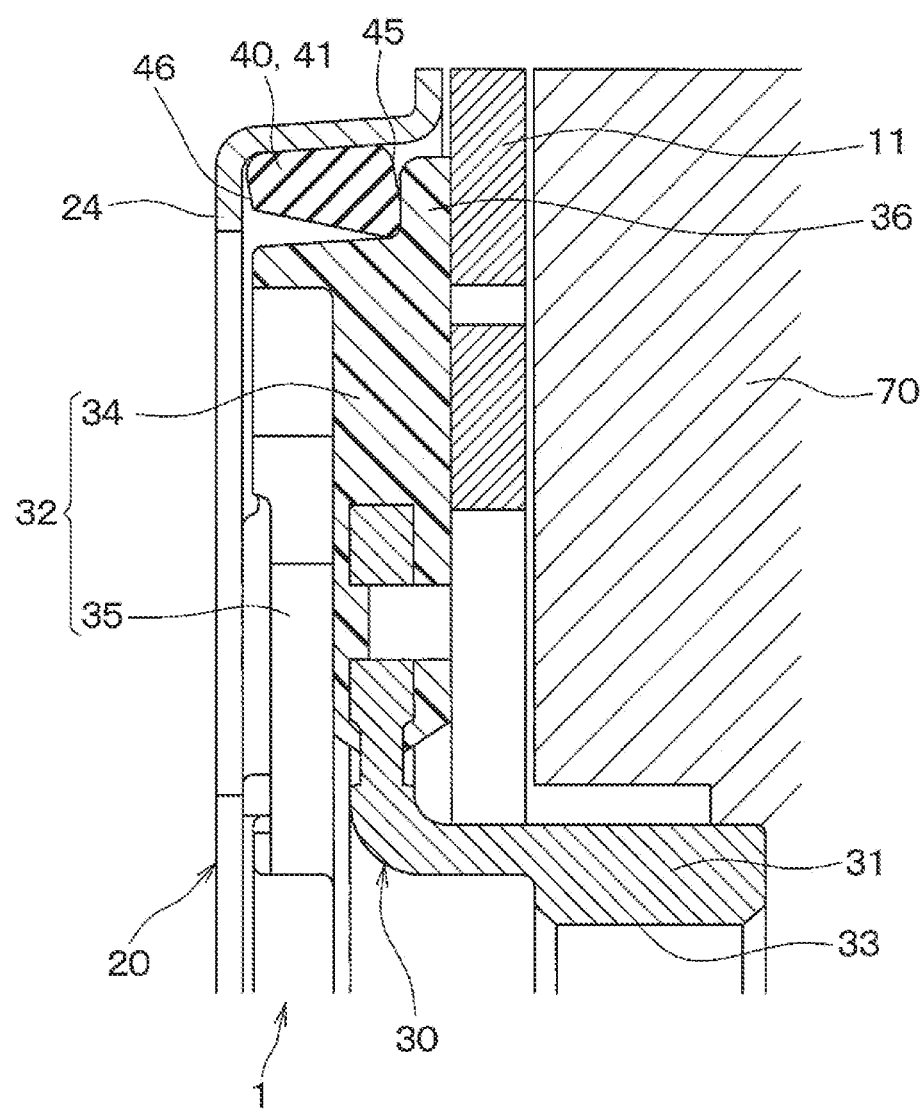
FIG. 18 is a cross-sectional diagram of a part of an electromagnetic clutch according to at least one embodiment of the present disclosure.

As shown in FIG. 18, in the fourth embodiment, the shape of the thick portion 41 of the rubber member 40 is different from that in the first embodiment. Specifically, in a cross-section parallel to the rotation axis, the thick portion 41 of the rubber member 40 in the unenergized state has a trapezoidal shape in which a side 45 facing the outside receiving rubber portion 36 is long and a side 46 facing the outside top plate portion 24 is short. The thick portion 41 of the rubber member 40 is in contact with the outside receiving rubber portion 36 and the outside top plate portion 24 both in the unenergized state and in the energized state. In the fourth embodiment, the rubber member 40 may not have the thin portion 42.

In the fourth embodiment, after the energization to the coil 92 is started, an area where the outside top plate portion 24 of the outer plate 20 and the thick portion 41 of the rubber member 40 are in contact with each other gradually increases as the rotor 70 and the armature 11 approach each other due to the magnetic attraction force. Accordingly, the urging force of the rubber member 40 non-linearly increases, and the collision speed of the rotor 70 and the armature 11 is reduced. Also in the fourth embodiment, the clutch noise generated at the start of torque transmission can be suppressed.

Fifth Embodiment

A fifth embodiment will be described. In the fifth embodiment, the shape of the rubber member 40 is changed with respect to the fourth embodiment, and the other parts are similar to that in the fourth embodiment, so only the difference from the fourth embodiment will be described.

Figure 19:
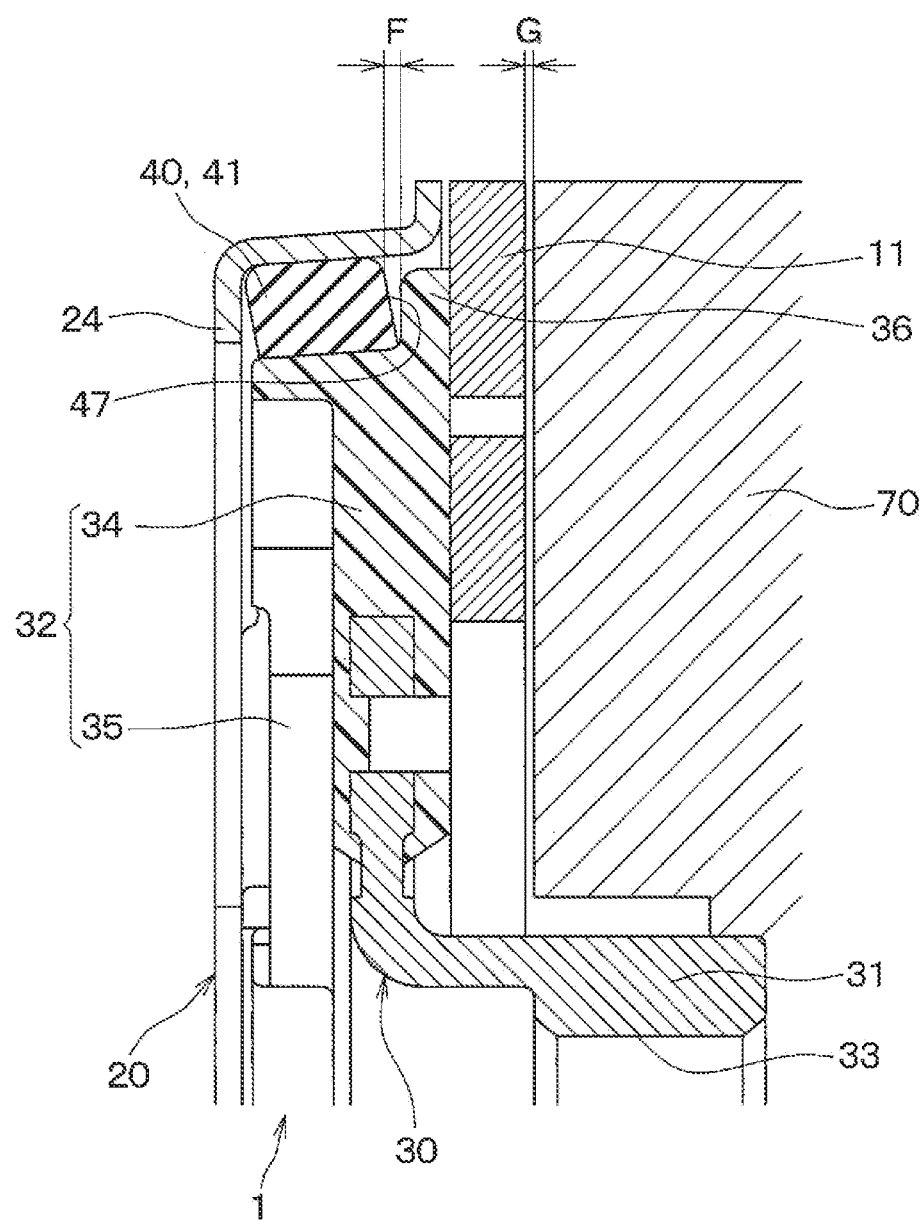
FIG. 19 is a cross-sectional diagram of a part of an electromagnetic clutch according to at least one embodiment of the present disclosure.

In the fifth embodiment, in a cross-section parallel to the rotation axis, the thick portion 41 of the rubber member 40 in the unenergized state has an inclined side 47 facing the outside receiving rubber portion 36 of the inner hub 30 as shown in FIG. 19. The inclined side 47 of the rubber member 40 extends radially outward from a part in contact with the outside receiving rubber portion 36 of the inner hub 30 and is inclined away from the outside receiving rubber portion 36. The inclined side 47 of the rubber member 40 is configured such that a maximum distance F between the outside receiving rubber portion 36 and the inclined side 47 is greater than the distance G between the rotor 70 and the armature 11. In the fifth embodiment, the rubber member 40 may not have the thin portion 42.

In the fifth embodiment, after the energization to the coil 92 is started, an area where the outside receiving rubber portion 36 of the inner hub 30 and the inclined side 47 of the rubber member 40 are in contact with each other gradually increases as the rotor 70 and the armature 11 approach each other due to the magnetic attraction force. Accordingly, the urging force of the rubber member 40 non-linearly increases, and the collision speed of the rotor 70 and the armature 11 is reduced. Also in the fifth embodiment, the clutch noise generated at the start of torque transmission can be suppressed.

Sixth Embodiment

A sixth embodiment will be described. In the sixth embodiment, the shape of the rubber member 40 is changed with respect to the fourth embodiment, and the other parts are similar to that in the fourth embodiment, so only the difference from the fourth embodiment will be described.

Figure 20:
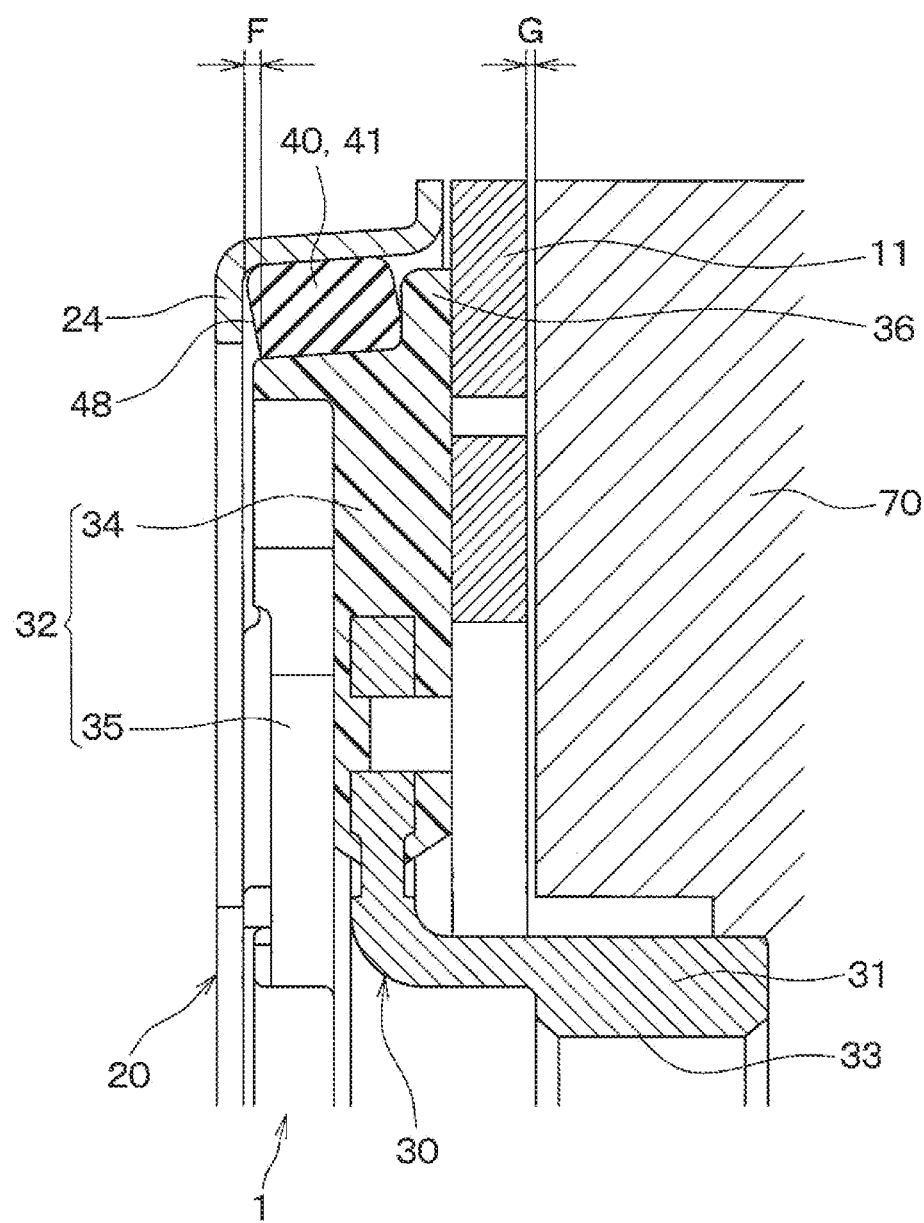
FIG. 20 is a cross-sectional diagram of a part of an electromagnetic clutch according to at least one embodiment of the present disclosure.

In the sixth embodiment, in a cross-section parallel to the rotation axis, the thick portion 41 of the rubber member 40 in the unenergized state has an inclined side 48 facing the outside top plate portion 24 of the outer plate 20 as shown in FIG. 20. The inclined side 48 of the rubber member 40 extends radially inward from a part in contact with the outside top plate portion 24 of the outer plate 20 and is inclined away from the outside top plate portion 24. The inclined side 48 of the rubber member 40 is configured such that a maximum distance F between the outside top plate portion 24 and the inclined side 48 is greater than the distance G between the rotor 70 and the armature 11. In the sixth embodiment, the rubber member 40 may not have the thin portion 42.

In the sixth embodiment, after the energization to the coil 92 is started, an area where the outside top plate portion 24 of the outer plate 20 and the inclined side 48 of the rubber member 40 are in contact with each other gradually increases as the rotor 70 and the armature 11 approach each other due to the magnetic attraction force. Accordingly, the urging force of the rubber member 40 non-linearly increases, and the collision speed of the rotor 70 and the armature 11 is reduced. Also in the sixth embodiment, the clutch noise generated at the start of torque transmission can be suppressed.

Seventh Embodiment

A seventh embodiment will be described. In the seventh embodiment, a part of the configuration of the rubber member 40 is changed with respect to the first embodiment, and the other parts are similar to that in the first embodiment, so only the difference from the first embodiment will be described.

Figure 21:
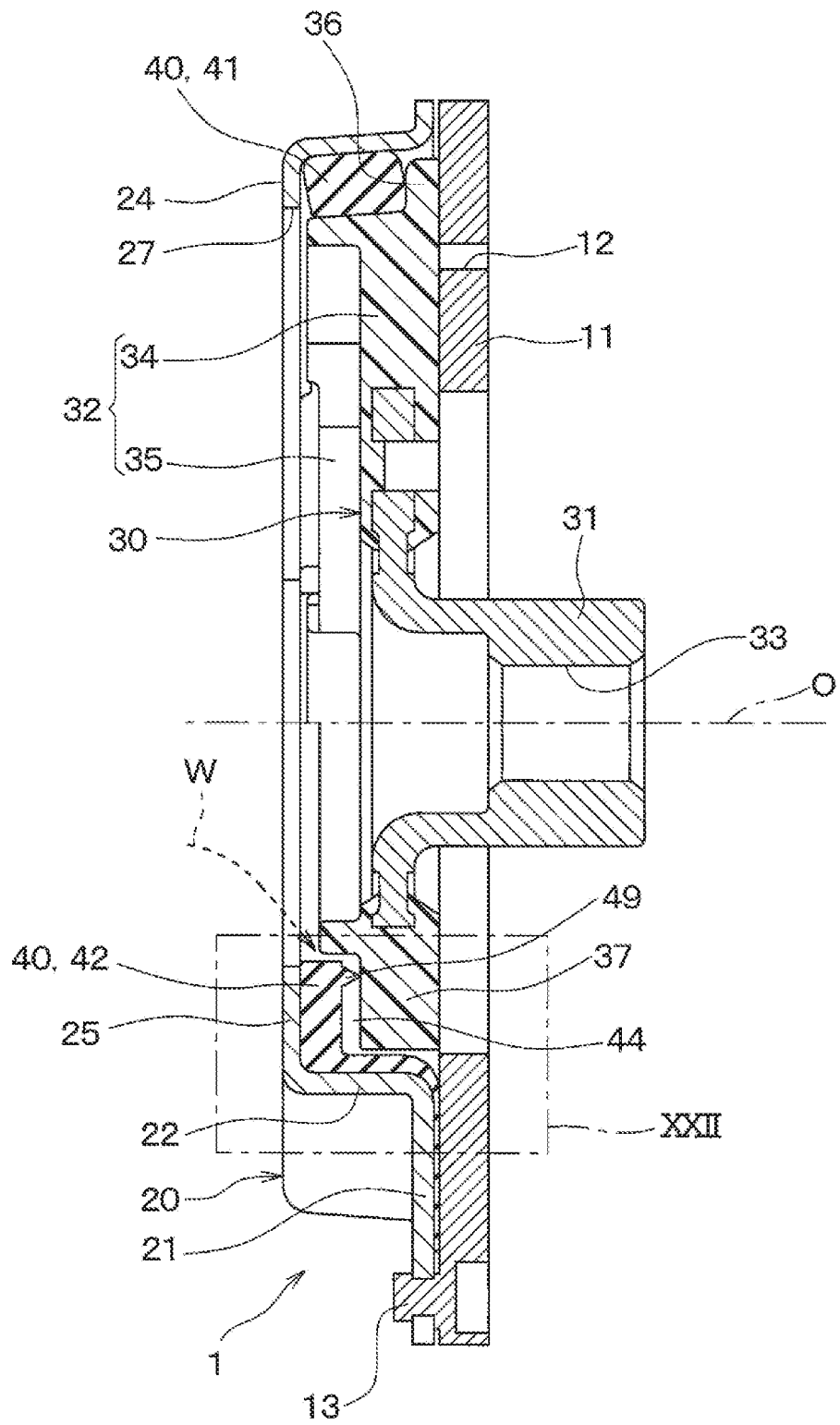
FIG. 21 is a cross-sectional diagram of an electromagnetic clutch according to at least one embodiment of the present disclosure.
Figure 22:
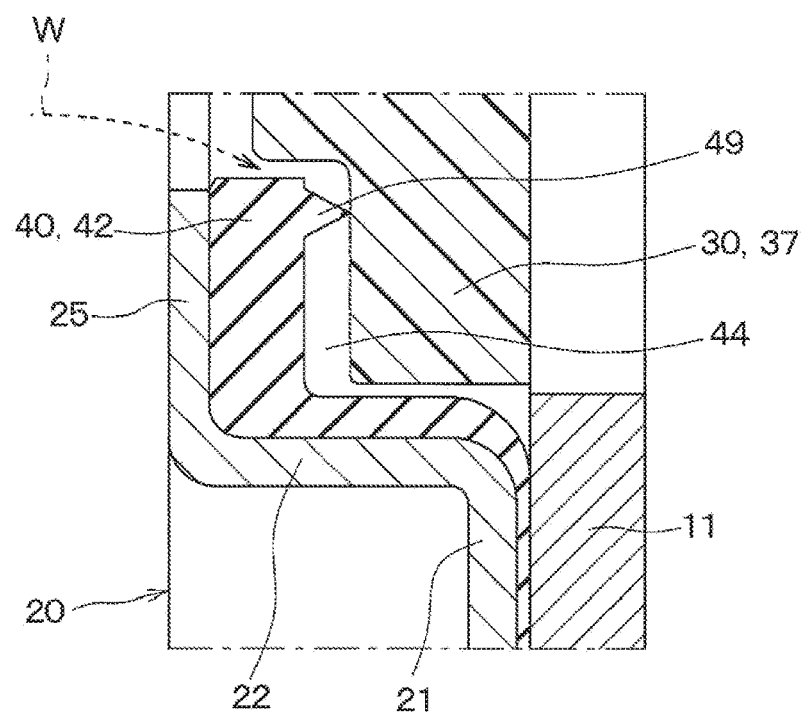
FIG. 22 is an enlarged view of XXII part of FIG. 21.
Figure 23:
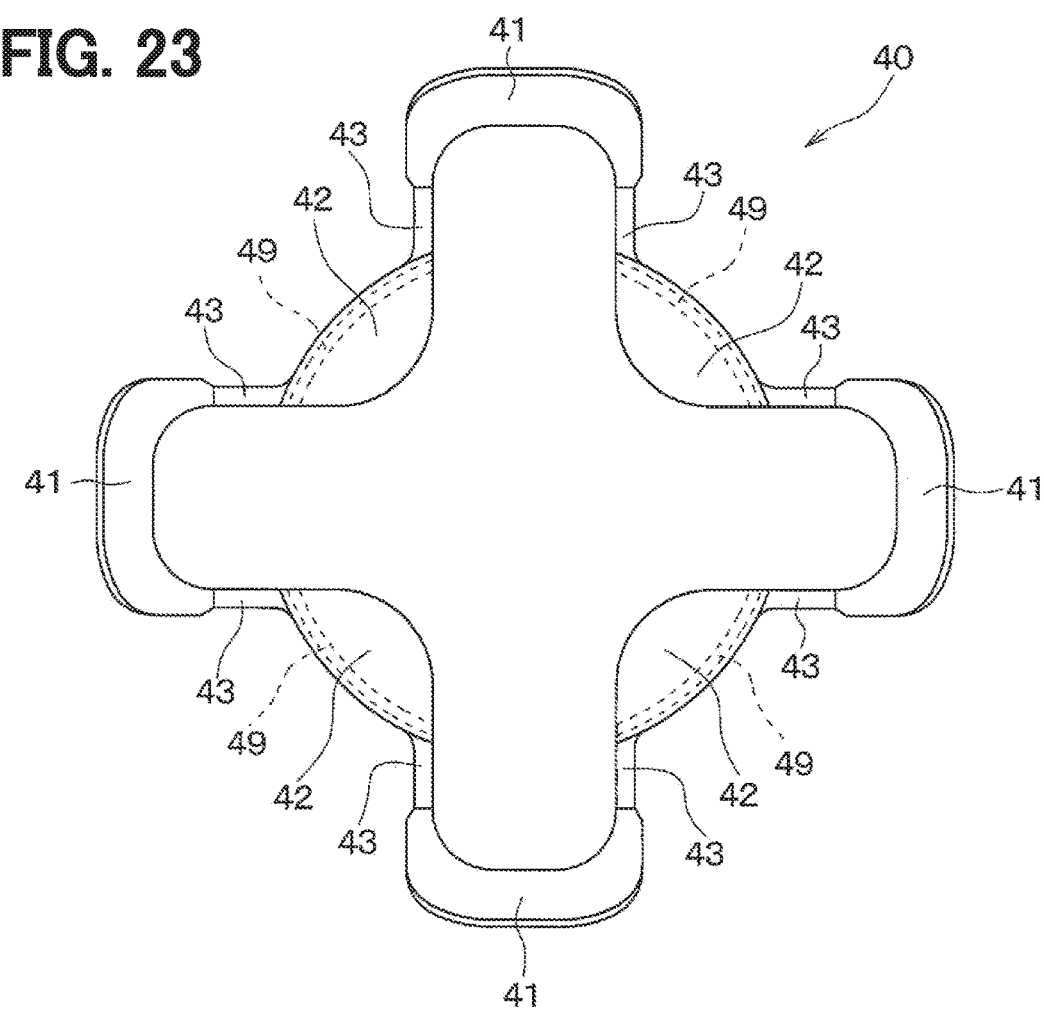
FIG. 23 is a plan view illustrating a rubber member of the electromagnetic clutch according to at least one embodiment of the present disclosure.

As shown in FIGS. 21-23, in the seventh embodiment, the predetermined clearance 44 is defined between the inside receiving rubber portion 37 of the inner hub 30 and the thin portion 42 of the rubber member 40 in the unenergized state as in the first embodiment. In the seventh embodiment, the rubber member 40 has a sealing portion 49 protruding from the thin portion 42 toward the inside receiving rubber portion 37. The sealing portion 49 protrudes from the thin portion 42 into the clearance 44 between the thin portion 42 and the inside receiving rubber portion 37. In the unenergized state, the sealing portion 49 is in contact with the inside receiving rubber portion 37. The sealing portion 49 of the thin portion 42 extends in the circumferential direction. According to this, the sealing portion 49 can limit the water from entering the inside from the outside through the clearance 44. In FIGS. 21, 22, a path through which the water may enter from the outside of the electromagnetic clutch 1 is indicated by a dashed arrow W.

In the seventh embodiment, since the sealing portion 49 limits the water from entering the inside from the outside through the clearance 44, it is possible to prevent rust from being generated on the rotor 70 and the armature 11. Accordingly, in the seventh embodiment, the clutch slipping can be suppressed, and the reliability in torque transmission can be increased as in the second and third embodiment.

In the seventh embodiment, when the magnetic attraction force is generated between the rotor 70 and the armature 11, the urging force of the rubber member 40 non-linearly increases as the rotor 70 and the armature 11 approach each other as in the first embodiment. Accordingly, the electromagnetic clutch 1 can suppress the clutch noise caused at the start of the torque transmission.

Eighth Embodiment

An eighth embodiment will be described hereafter. In the eighth embodiment, a part of the configurations is changed with respect to the first embodiment, and the other parts are similar to that in the first embodiment, so only the difference from the first embodiment will be described.

Figure 24:
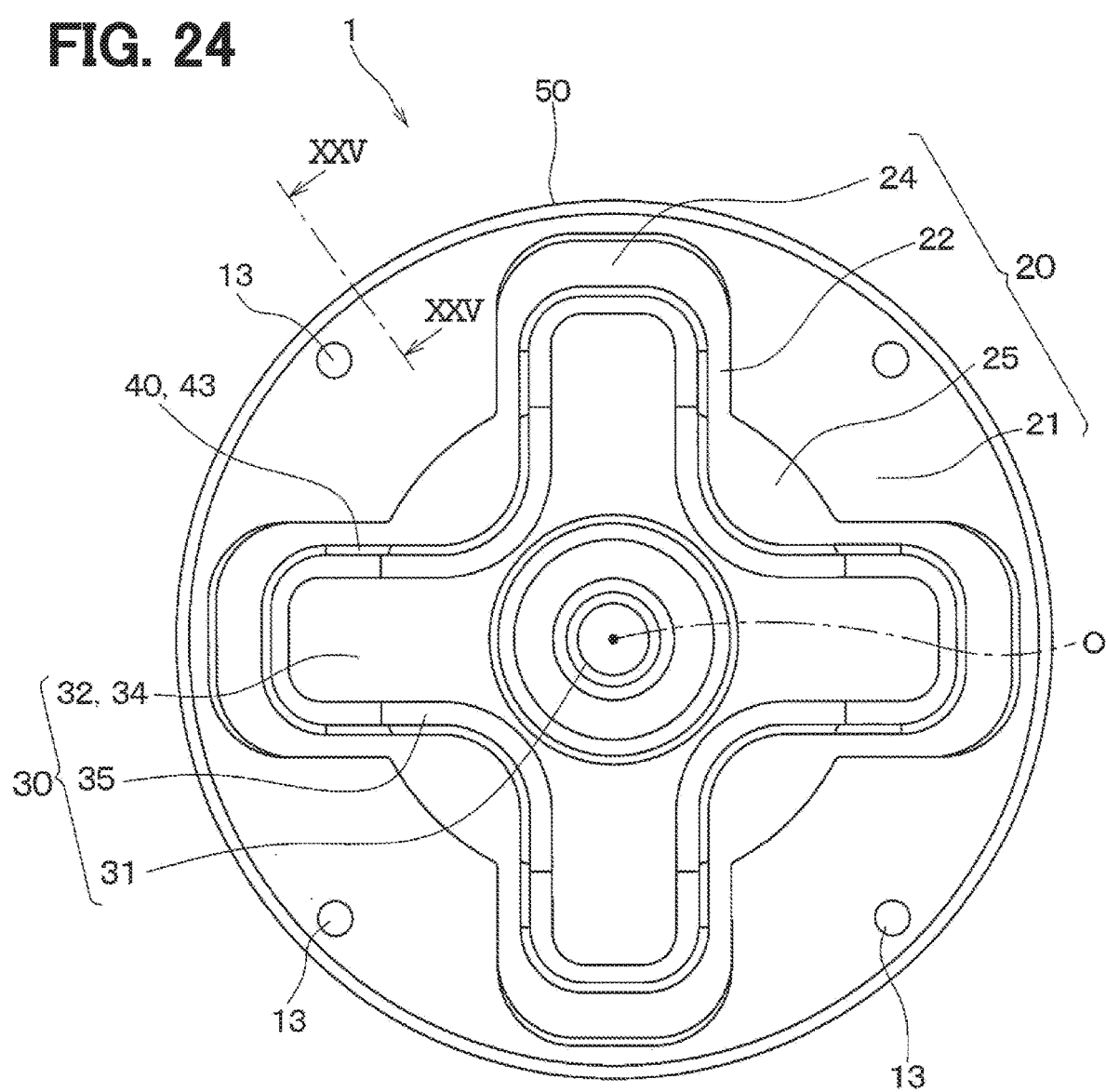
FIG. 24 is a plan view of an electromagnetic clutch according to at least one embodiment of the present disclosure.
Figure 25:
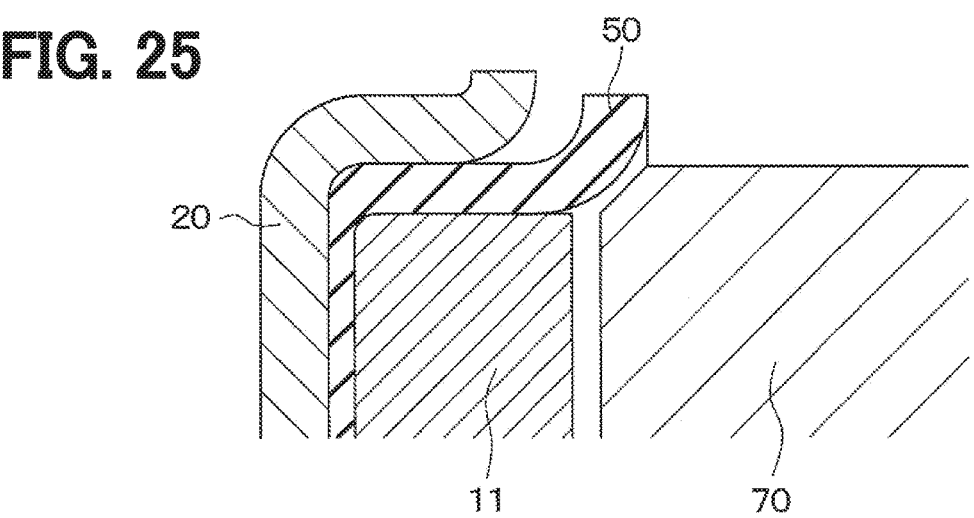
FIG. 25 is a cross-sectional diagram of a part of the electromagnetic clutch taken along XXV-XXV line of FIG. 24.

As shown in FIGS. 24, 25, the electromagnetic clutch 1 of the eighth embodiment includes a flange portion 50 protruding radially outward from a gap between the armature 11 and the outer plate 20. The flange portion 50 has an annular shape. The flange portion 50 is made of rubber. The flange portion 50 extends throughout the entire circumference of the electromagnetic clutch 1 to cover the gap between the rotor 70 and the armature 11. Accordingly, the flange portion 50 can limit the entrance of the water into the gap between the rotor 70 and the armature 11. The flange portion 50 may be a part of the rubber member 40 described in the first to seventh embodiments or a separate component from the rubber member 40.

In the eighth embodiment, since the flange portion 50 limits the water from entering the gap between the rotor 70 and the armature 11 from the outside, it is possible to prevent rust from being generated on the rotor 70 and the armature 11. Accordingly, the configurations of the eighth embodiment also can suppress so-called clutch slipping and increase the reliability in torque transmission.

Other Embodiments

The present disclosure is not limited to the embodiments described above, and can be modified as appropriate. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Also, the shape, the positional relationship, and the like of the component or the like mentioned in the above embodiments are not limited to those being mentioned unless otherwise specified, limited to the specific shape, positional relationship, and the like in principle, or the like.

For example, in the above-described embodiments, the inner hub 30 is configured not to be rotatable relatively to the outer plate 20. However, the configuration is not limited to this. The inner hub 30 may be engaged with the armature 11 so as not to be rotatable relatively to the armature 11.

For example, in the above-described embodiments, the thick portion 41, the thin portion 42, and the connecting portion 43 are integrated as a single component, i.e. the rubber member 40. However, the rubber member 40 may be separated such that the thick portion 41, the thin portion 42, and the connecting portion 43 are separate components.

For example, in the above-described embodiments, the thick portion 41 is located outside of the thin portion 42 in the radial direction of the electromagnetic clutch 1. However, the arrangement of the thick portion 41 and the thin portion 42 of the rubber member 40 may be switched.

CONCLUSION

According to a first aspect described in some or all of the above embodiments, the electromagnetic clutch configured to transmit torque from the actuator to the driven device includes the armature, the outer plate, the inner hub, and the rubber member. The armature is configured to come into contact with the actuator due to magnetic attraction force. The outer plate is fixed to the armature, the outer plate being located on an opposite side of the armature from the actuator, the outer plate being configured to rotate together with the armature. The inner hub is located between the armature and the outer plate to be movable in a direction along a rotation axis, the inner hub being engaged with the armature or the outer plate with respect to a direction of rotation, the inner hub being fixed to the driven device. The rubber member is disposed between the inner hub and the outer plate to give an urging force to the inner hub and the outer plate in a direction away from each other. In the electromagnetic clutch, the urging force of the rubber member 40 non-linearly increases as the rotor and the armature approach each other due to the magnetic attraction force.

According to a second aspect, the rubber member is configured such that an area in which the rubber member is in contact with the inner hub or the outer plate immediately before the actuator and the armature come into contact with each other is greater than an area in which the rubber member is in contact with the inner hub or the outer plate from a state where the magnetic attraction force is not generated between the actuator and the armature to a state where the actuator and the armature come into contact with each other.

According to this, since the area in which the rubber member contacts the inner hub or the outer plate becomes large immediately before the actuator and the armature comes into contact, the urging force of the rubber member non-linearly increases. Since the urging force of the rubber member works as a resistance against the magnetic attraction force between the actuator and the armature, the moving speed of the actuator and the armature decrease before the actuator and the armature come into contact with each other. Accordingly, the electromagnetic clutch can suppress the clutch noise caused at the start of the torque transmission.

According to a third aspect, the rubber member includes a thick portion and a thin portion. The thick portion is continuously in contact with the inner hub and the outer plate from a state where the magnetic attraction force is not generated between the actuator and the armature to a state where the actuator and the armature come into contact with each other. The thin portion defines a clearance with the inner hub or the outer plate in the state where the magnetic attraction force is not generated between the actuator and the armature. The thin portion is configured such that the clearance disappears while the actuator and the armature approach each other.

According to this, the thick portion mainly exerts resistance against the magnetic attraction force between the actuator and the armature from when the magnetic attraction force is generated between the actuator and the armature to a specific timing while the actuator and the armature approach each other. When the clearance between the thin portion and the inner hub or the outer plate disappears at the specific timing while the actuator and the armature approach each other, both the thick portion and the thin portion exert resistance against the magnetic attraction force between the actuator and the armature. Accordingly, the resistance against the magnetic attraction force between the actuator and the armature non-linearly increases from the specific timing while the actuator and the armature approach each other to a timing when the actuator and the armature come into contact with each other. Accordingly, the electromagnetic clutch can suppress the clutch noise caused at the start of the torque transmission.

According to a fourth aspect, the size of the clearance between the thin portion and the inner hub or the outer plate in the state where the magnetic attraction force is not generated between the actuator and the armature is less than the distance between the actuator and the armature.

According to this, the clearance between the thin portion and the inner hub or the outer plate can be disappeared at the specific timing while the actuator and the armature approach each other.

According to a fifth aspect, the electromagnetic clutch further includes a protrusion protruding from the inner hub or the outer plate toward the thin portion into the clearance between the thin portion and the inner hub or the outer plate.

According to this, even when the clearance is defined between the thin portion and the inner hub or the outer plate, the protrusion limits outside water from entering the inside through the clearance. Accordingly, generation of rust on the actuator and the armature can be suppressed. As a result, this electromagnetic clutch can increase the reliability in torque transmission from the actuator to the driven device.

According to a sixth aspect, the rubber member includes a sealing portion protruding from the thin portion to contact the inner hub or the outer plate so as to limit water from entering the inside from the outside through the clearance.

According to this, even when the clearance is defined between the thin portion and the inner hub or the outer plate, the sealing portion limits outside water from entering the inside through the clearance. Accordingly, generation of rust on the actuator and the armature can be suppressed. As a result, this electromagnetic clutch can suppress so-called clutch slipping and increase the reliability in torque transmission from the actuator to the driven device.

According to a seventh aspect, in a cross section parallel to the rotation axis, the rubber member has a trapezoidal shape whose one side facing the inner hub or the outer plate is longer than an opposite side in the state where the magnetic attraction force is not generated between the actuator and the armature.

According to this, an area where the rubber member having the trapezoidal shape is in contact with the inner hub or the outer plate increases as the actuator and the armature approach each other due to the magnetic attraction force. Accordingly, the urging force of the rubber member non-linearly increases with increase of displacement amount of the armature, and the collision speed of the actuator and the armature is reduced. Accordingly, the electromagnetic clutch can suppress the clutch noise caused at the start of the torque transmission.

According to an eighth embodiment, in a cross section parallel to the rotation axis, the rubber member has an inclined side in the state where the magnetic attraction force is not generated between the actuator and the armature. The inclined side is inclined away from the inner hub or the outer plate from a part at which the inclined side contacts with the inner hub or the outer plate in a predetermined direction. The maximum distance between the inclined side and the inner hub or the outer plate is greater than the distance between the actuator and the armature.

According to this, an area where the rubber member is in contact with the inner hub or the outer plate increases as the actuator and the armature approach each other due to the magnetic attraction force. Accordingly, the urging force of the rubber member non-linearly increases with increase of displacement amount of the armature, and the collision speed of the actuator and the armature is reduced. Accordingly, the electromagnetic clutch can suppress the clutch noise caused at the start of the torque transmission.

According to a ninth aspect, the electromagnetic clutch further includes a flange portion having an annular shape and protruding radially outward from a gap between the armature and the outer plate to cover the gap between the actuator and the armature.

According to this, the flange portion limits water from entering the gap between the actuator and the armature from radially outside of the electromagnetic clutch. Therefore, it is possible to suppress rust from being generated on the actuator and the armature. As a result, this electromagnetic clutch can suppress so-called clutch slipping and increase the reliability in torque transmission from the actuator to the driven device.

According to a tenth aspect, the electromagnetic clutch configured to transmit torque from the actuator to the driven device includes the armature, the outer plate, the inner hub, and the rubber member. The armature is configured to come into contact with the actuator due to magnetic attraction force. The outer plate is fixed to the armature, the outer plate being located on an opposite side of the armature from the actuator, the outer plate being configured to rotate together with the armature. The inner hub is located between the armature and the outer plate to be movable in a direction along a rotation axis, the inner hub being engaged with the armature or the outer plate with respect to a direction of rotation, the inner hub being fixed to the driven device. The rubber member is disposed between the inner hub and the outer plate to give an urging force to the inner hub and the outer plate in a direction away from each other. The rubber member includes the thin portion and the sealing portion. The thin portion defines a clearance with the inner hub or the outer plate in the state where the magnetic attraction force is not generated between the actuator and the armature. The sealing portion protrudes from the thin portion to contact the inner hub or the outer plate so as to limit water from entering the inside from the outside through the clearance.

Since the rubber member of the this aspect includes the sealing portion, the outside water can be limited from entering the inside through the clearance even though the clearance is defined between the thin portion and the inner hub or the outer plate. Accordingly, generation of rust on the actuator and the armature can be suppressed. As a result, this electromagnetic clutch can suppress so-called clutch slipping and increase the reliability in torque transmission from the actuator to the driven device.

According to an eleventh aspect, the electromagnetic clutch configured to transmit torque from the actuator to the driven device includes the armature, the outer plate, the inner hub, the rubber member, and the flange portion. The armature is configured to come into contact with the actuator due to magnetic attraction force. The outer plate is fixed to the armature, the outer plate being located on an opposite side of the armature from the actuator, the outer plate being configured to rotate together with the armature. The inner hub is located between the armature and the outer plate to be movable in a direction along a rotation axis, the inner hub being engaged with the armature or the outer plate with respect to a direction of rotation, the inner hub being fixed to the driven device. The rubber member is disposed between the inner hub and the outer plate to give an urging force to the inner hub and the outer plate in a direction away from each other. The flange portion has an annular shape and protrudes radially outward from a gap between the armature and the outer plate to cover the gap between the actuator and the armature.

According to this, the flange portion limits water from entering the gap between the actuator and the armature from radially outside of the electromagnetic clutch. Therefore, it is possible to suppress rust from being generated on the actuator and the armature. As a result, this electromagnetic clutch can suppress so-called clutch slipping and increase the reliability in torque transmission from the actuator to the driven device.

What is claimed is:

1. An electromagnetic clutch configured to transmit torque from an actuator to a driven device, the electromagnetic clutch comprising:
   an armature configured to come into contact with the actuator due to magnetic attraction force;
   an outer plate fixed to the armature, the outer plate being on an opposite side of the armature from the actuator, the outer plate being configured to rotate with the armature;
   an inner hub between the armature and the outer plate, the inner hub being engaged with the armature or the outer plate with respect to a direction of rotation, the inner hub being fixed to the driven device; and
   a rubber member between the inner hub and the outer plate to give an urging force to the inner hub and the outer plate in a direction away from each other, wherein
   the rubber member is configured to non-linearly increase the urging force as the actuator and the armature approach each other due to the magnetic attraction force, and
   the rubber member includes
      a thick portion continuously in contact with the inner hub and the outer plate from a state where the magnetic attraction force is not generated between the actuator and the armature to a state where the actuator and the armature come into contact with each other, and
      a thin portion defining a clearance with the inner hub or the outer plate in a state where the magnetic attraction force is not generated between the actuator and the armature, the thin portion being configured such that the clearance disappears while the actuator and the armature approach each other.

2. The electromagnetic clutch according to claim 1, wherein
   a size of the clearance defined between the thin portion and the inner hub or the outer plate in the state where the magnetic attraction force is not generated between the actuator and the armature is less than a distance between the actuator and the armature.

3. The electromagnetic clutch according to claim 1, further comprising:
   a protrusion protruding from the inner hub or the outer plate toward the thin portion into the clearance between the thin portion and the inner hub or the outer plate.

4. The electromagnetic clutch according to claim 1, wherein
   the rubber member includes a sealing portion protruding from the thin portion to contact with the inner hub or the outer plate so as to limit water from entering an inside from an outside through the clearance.

5. An electromagnetic clutch configured to transmit torque from an actuator to a driven device, the electromagnetic clutch comprising:
   an armature configured to come into contact with the actuator due to magnetic attraction force;
   an outer plate fixed to the armature, the outer plate being on an opposite side of the armature from the actuator, the outer plate being configured to rotate with the armature;
   an inner hub between the armature and the outer plate, the inner hub being engaged with the armature or the outer plate with respect to a direction of rotation, the inner hub being fixed to the driven device; and a rubber member between the inner hub and the outer plate to give an urging force to the inner hub and the outer plate in a direction away from each other, wherein the rubber member is configured to non-linearly increase the urging force as the actuator and the armature approach each other due to the magnetic attraction force, and in a cross section parallel to the rotation axis, the rubber member has a trapezoidal shape whose one side facing the inner hub or the outer plate is longer than an opposite side in a state where the magnetic attraction force is not generated between the actuator and the armature.

6. An electromagnetic clutch configured to transmit torque from an actuator to a driven device, the electromagnetic clutch comprising:

an armature configured to come into contact with the actuator due to magnetic attraction force;

an outer plate fixed to the armature, the outer plate being on an opposite side of the armature from the actuator, the outer plate being configured to rotate with the armature;

an inner hub between the armature and the outer plate, the inner hub being engaged with the armature or the outer plate with respect to a direction of rotation, the inner hub being fixed to the driven device; and a rubber member between the inner hub and the outer plate to give an urging force to the inner hub and the outer plate in a direction away from each other, wherein the rubber member is configured to non-linearly increase the urging force as the actuator and the armature approach each other due to the magnetic attraction force, in a cross section parallel to the rotation axis, the rubber member has an inclined side inclined in a predetermined direction away from the inner hub or the outer plate from a part in contact with the inner hub or the outer plate in a state where the magnetic attraction force is not generated between the actuator and the armature, and a maximum distance from the inclined side to the inner hub or the outer plate is greater than a distance between the actuator and the armature.

7. An electromagnetic clutch configured to transmit torque from an actuator to a driven device, the electromagnetic clutch comprising:

an armature configured to come into contact with the actuator due to magnetic attraction force;

an outer plate fixed to the armature, the outer plate being on an opposite side of the armature from the actuator, the outer plate being configured to rotate with the armature;

an inner hub between the armature and the outer plate, the inner hub being engaged with the armature or the outer plate with respect to a direction of rotation, the inner hub being fixed to the driven device;

a rubber member between the inner hub and the outer plate to give an urging force to the inner hub and the outer plate in a direction away from each other; and a flange portion having an annular shape and protruding radially outward from a gap between the actuator and the armature to cover the gap between the actuator and the armature, wherein the rubber member is configured to non-linearly increase the urging force as the actuator and the armature approach each other due to the magnetic attraction force.

8. An electromagnetic clutch configured to transmit torque from an actuator to a driven device, the electromagnetic clutch comprising:

an armature configured to come into contact with the actuator due to magnetic attraction force;

an outer plate fixed to the armature, the outer plate being on an opposite side of the armature from the actuator, the outer plate being configured to rotate with the armature;

an inner hub between the armature and the outer plate, the inner hub being engaged with the armature or the outer plate with respect to a direction of rotation, the inner hub being fixed to the driven device; and a rubber member between the inner hub and the outer plate to give an urging force to the inner hub and the outer plate in a direction away from each other, wherein the rubber member includes a thin portion defining a clearance with the inner hub or the outer plate in a state where the magnetic attraction force is not generated between the actuator and the armature, and a sealing portion protruding from the thin portion to contact the inner hub or the outer plate so as to limit water from entering an inside from an outside through the clearance.

9. An electromagnetic clutch configured to transmit torque from an actuator to a driven device, the electromagnetic clutch comprising:

an armature configured to come into contact with the actuator due to magnetic attraction force;

an outer plate fixed to the armature, the outer plate being on an opposite side of the armature from the actuator, the outer plate being configured to rotate with the armature;

an inner hub between the armature and the outer plate, the inner hub being engaged with the armature or the outer plate with respect to a direction of rotation, the inner hub being fixed to the driven device; and a rubber member between the inner hub and the outer plate to give an urging force to the inner hub and the outer plate in a direction away from each other; and a flange portion having an annular shape and protruding radially outward from a gap between the armature and the outer plate to cover the gap between the actuator and the armature.

* * * * *